United States Patent
Kim et al.

(10) Patent No.: US 11,991,366 B2
(45) Date of Patent: *May 21, 2024

(54) IN-LOOP FILTERING METHOD ACCORDING TO ADAPTIVE PIXEL CLASSIFICATION STANDARD

(71) Applicant: Industry-University Cooperation Foundation Hanyang University, Seoul (KR)

(72) Inventors: Ki Baek Kim, Seoul (KR); Je Chang Jeong, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,242

(22) Filed: Dec. 8, 2022

(65) Prior Publication Data

US 2023/0106301 A1 Apr. 6, 2023

Related U.S. Application Data

(63) Continuation of application No. 17/338,771, filed on Jun. 4, 2021, now Pat. No. 11,553,186, which is a
(Continued)

(30) Foreign Application Priority Data

Mar. 22, 2017 (KR) .................. 10-2017-0036370

(51) Int. Cl.
*H04N 19/14* (2014.01)
*H04N 19/117* (2014.01)
(Continued)

(52) U.S. Cl.
CPC .......... *H04N 19/14* (2014.11); *H04N 19/117* (2014.11); *H04N 19/182* (2014.11); *H04N 19/82* (2014.11)

(58) Field of Classification Search
CPC .. H04N 19/117; H04N 19/119; H04N 19/136; H04N 19/82; H04N 19/96; H04N 19/14
See application file for complete search history.

(56) References Cited

U.S. PATENT DOCUMENTS 11,057,627 B2 * 7/2021 Kim ................. H04N 19/119
2012/0008675 A1 1/2012 Karczewicz et al.
(Continued)

FOREIGN PATENT DOCUMENTS

CN 102742275 A 10/2012
CN 103283234 A 9/2013
(Continued)

OTHER PUBLICATIONS

Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, 12th Meeting, Geneva, CH, Jan. 14-23, 2013, JCTVC-L1003v34 (309 pages total).
(Continued)

*Primary Examiner* — Mainul Hasan
(74) *Attorney, Agent, or Firm* — Sughrue Mion, PLLC

(57) ABSTRACT

The in-loop filtering method performed by a video decoding apparatus includes: classifying reconstructed samples according to an absolute classification standard or relative classification standard; acquiring offset data on the basis of results of classifying the reconstructed samples; adding an offset value to the reconstructed samples by referencing the acquired offset data; and outputting the offset value-added
(Continued)

reconstructed samples. Accordingly, W errors in the reconstructed image can be corrected.

4 Claims, 14 Drawing Sheets

Related U.S. Application Data continuation of application No. 16/496,253, filed as application No. PCT/KR2018/003352 on Mar. 22, 2018, now Pat. No. 11,057,627.

(51) Int. Cl.
  *H04N 19/182* (2014.01)
  *H04N 19/82* (2014.01)

(56) References Cited

U.S. PATENT DOCUMENTS

| | | | |
|---|---|---|---|
| 2012/0099646 A1 | 4/2012 | Coban et al. | |
| 2013/0003837 A1 | 1/2013 | Yu et al. | |
| 2013/0051475 A1 | 2/2013 | Joshi et al. | |
| 2013/0202051 A1 | 8/2013 | Zhou | |
| 2014/0092958 A1* | 4/2014 | Sato | H04N 19/96 375/240.02 |
| 2014/0140416 A1* | 5/2014 | Yamazaki | H04N 19/14 375/240.25 |
| 2014/0185665 A1* | 7/2014 | Pu | H04N 19/187 375/240.02 |
| 2014/0369429 A1* | 12/2014 | Laroche | H04N 19/85 375/240.29 |
| 2014/0376608 A1* | 12/2014 | Tourapis | H04N 19/186 375/240.02 |
| 2015/0023406 A1 | 1/2015 | Lee et al. | |
| 2015/0049821 A1* | 2/2015 | Chen | H04N 19/176 375/240.24 |
| 2016/0021379 A1* | 1/2016 | Minezawa | H04N 19/124 375/240.13 |
| 2017/0154976 A1 | 6/2017 | Oh et al. | |
| 2017/0223352 A1 | 8/2017 | Kim et al. | |
| 2017/0280162 A1* | 9/2017 | Zhao | H04N 19/103 |
| 2018/0352231 A1 | 12/2018 | Lee et al. | |
| 2019/0020881 A1 | 1/2019 | Filippov et al. | |
| 2019/0075328 A1* | 3/2019 | Huang | H04N 19/119 |
| 2020/0186805 A1* | 6/2020 | Lee | H04N 19/176 |
| 2021/0337197 A1 | 10/2021 | Lee | |

FOREIGN PATENT DOCUMENTS

| | | |
|---|---|---|
| EP | 2 846 543 A1 | 3/2015 |
| JP | 2016-015753 A | 1/2016 |
| JP | 10-2016-0015799 A | 2/2016 |
| JP | 5951144 B2 | 7/2016 |
| KR | 10-2014-0028118 A | 3/2014 |
| KR | 10-2014-0037264 A | 3/2014 |
| KR | 10-2016-0015799 A | 2/2016 |
| KR | 10-2016-0038062 A | 4/2016 |
| KR | 10-2016-0111293 A | 9/2016 |
| KR | 10-2016-0147895 A | 12/2016 |
| WO | 2012/087713 A1 | 6/2012 |
| WO | 2013/073184 A1 | 5/2013 |
| WO | WO-2013115606 A1 * | 8/2013 ........... H04N 19/119 |

OTHER PUBLICATIONS

Chen et al., "Algorithm Description of Joint Exploration Test Model 4", Joint Video Exploration Team (JVET) of ITU-T SG 16 WP 3 and ISO/IEC JTC 1/SC 29/WG 11, 3rd Meeting, Geneva, CH, May 26-Jun. 1, 2016, JVET-C1001v3 (38 pages total).
Communication dated Feb. 7, 2022 from the Korean Patent Office in Korean Application No. 10-2019-7027158.
Extended European Search Report dated Mar. 4, 2022 in European Application No. 21186030.9.
Extended European Search Report dated Dec. 7, 2020 in European Application No. 18770923.3.
Final Office Action issued in prior U.S. Appl. No. 16/496,253 dated Nov. 2, 2020.
International Search Report for PCT/KR2018/003352, dated Jul. 12, 2018.
Jianle Chen et al., "JVET AHG report: JEM algorithm description editing (AHG2)", Joint Video Exploration Team (JVET) of ITU-T SG 16 WP 3 and ISO/IEC JTC 1/SC 29/WG 11, Document: JVET-D0002, 2016, pp. 1-3 (3 pages total).
Non-Final Office Action issued in parent U.S. Appl. No. 16/496,253 dated May 12, 2020.
Notice of Allowance issued in prior U.S. Appl. No. 16/496,253 dated Mar. 1, 2021.
Office Action dated Sep. 15, 2021 in Indian Application No. 201917041805.
Sullivan et al., "Overview of the High Efficiency Video Coding (HEVC) Standard", IEEE Transactions on Circuits and Systems for Video Technology, Dec. 2012, vol. 22, No. 12, pp. 1649-1668 (20 pages total).
Non-Final Office Action dated Feb. 25, 2022 in parent U.S. Appl. No. 17/338,771.
Notice of Allowance dated Sep. 14, 2022 in parent U.S. Appl. No. 17/338,771.
Office Action dated Jan. 11, 2023 from the Chinese Patent Office in Application No. 201880033604.2.
Office Action dated Nov. 20, 2023 in Korean Application No. 10-2022-7031525.
Korean Office Action dated May 17, 2023 in Korean Application No. 10-2022-7031525.
An et al., "Block partitioning structure for next generation video coding", Telecommunication Standardization Sector, 2015, pp. 1-8 (8 pages total).
Fuldseth et al., "Tiles", Joint Collaborative Team on Video Coding (JCT-VC) of ITU-T SG16 WP3 and ISO/IEC JTC1/SC29/WG11, Document: JCTVC-F335, Jul. 2011, pp. 1-15 (15 pages total).
Cho et al., "Low Area Hardware Design of Efficient SAO for HEVC Encoder", Journal of the Korea Institute of Information and Communication Engineering, 2015, vol. 19, No. 1, pp. 169-177 (9 pages total).
Chen et al., "Algorithm Description of Joint Exploration Test Model 2", Joint Video Exploration Team (JVET) of ITU-T SG 16 WP 3 and ISO/IEC JTC 1/SC 29/WG 11, Document: JVET-B1001_v3, Feb. 2016, pp. 1-30 (32 pages total).

* cited by examiner

FIG. 7

```
Tile information( )
{
        tile_enabled_flag if(tile_enabled_flag)
        {
                num_tile_rows_minus1
                num_tile_columns_minus1
                loop_filter_across_tile_enabled_flag
                independent_tile_coding_setting_enabled_flag if(independent_tile_coding_setting_enabled_flag)
                {
                        tile-qp_offset_enabled_flag
                        tile-coding_skip_enabled_flag
                        tile-adaptive_scan_enabled_flag
                } if(independent_tile_coding_setting_enabled_flag)
                  for(i=0; i<=Num_tile_rows_minus1; i++)
                    for(j=0; j<=Num_tile_rows_minus_1; j++)
                    {
                        if(tile_coding_skip_enabled_flag)
                        {
                                tile_coding_skip_flag[i] [j]

if(!tile_coding_skip_flag)
                                {
                                    tile_type if(tile_adaptive_scan_enabled_flag)
                                            tile_scan_idx[i] [j]

if(tile_qp_offset_enabled_flag)
                                            tile_qp_offset[i] [j]
                                }
                        }
                    }
        }
}
```

FIG. 13

```
SAO information( )
{
        sps_sample_adaptive_offset_enabled_flag if(sps_sample_adaptive_offset_enabled_flag)
                pps_sample_adaptive_offset_enabled_flag if(pps_sample_adaptive_offset_enabled_flag)
                slice_sample_adaptive_offset_enabled_flag if(slice_sample_adaptive_offset_enabled_flag)
        {
                slice_sao_luma_flag
                slice_sao_chroma_flag
        } if(slice_sao_luma_flag || slice_sao_chroma_flag)
        {
                offset_type1_enabled_flag if(offset_type_1_enabled_flag)
                        offset_type2_enabled_flag sao_merge_flag if(sao_merge_flag)
                        sao_merge_idx
                else
                {
                        if(offset_type1_enabled_flag && offset_type2_enabled_flag)
                                sao_type_idx for(i=0; i<k; i++)
                                sao_offset_abs[i]
                        if(sao_type_idx !=0)
                                for(i=0, i<k; i++)
                                        if(sao_offset_abs[i] !=0)
                                                sao_offset_sign[i]

sao_type_info[sao_type_idx]
                }
        }
}
```

IN-LOOP FILTERING METHOD ACCORDING TO ADAPTIVE PIXEL CLASSIFICATION STANDARD

This application is a Continuation of U.S. application Ser. No. 17/338,771 filed on Jun. 4, 2021, which is a Continuation of U.S. application Ser. No. 16/496,253 filed on Sep. 20, 2019 (now U.S. Pat. No. 11,057,627), which is a National Stage of International Application No. PCT/KR2018/003352 filed Mar. 22, 2018, claiming priority based on Korean Patent Application No. 10-2017-036370 filed Mar. 22, 2017.

TECHNICAL FIELD

The present invention relates to an in-loop filtering method according to an adaptive pixel classification standard. More particularly, the present invention relates to a method of performing filtering on a reconstructed sample by classifying the reconstructed sample according to an absolute classification standard or relative classification standard, and adding an offset value adaptively set according to the classification result to the reconstructed sample.

BACKGROUND ART

The organizations called ISO/ISE MPEG (Moving Picture Experts Group) and ITU-T VCEG (Video Coding Experts Group) have organized the Joint Collaborative Team on Video Coding (JCT-VC), and JCT-VC created video coding standard technology that is ISO/IEC MPEG-H HEVC (High Efficiency Video Coding)/ITU-T H.265. In addition, in order to satisfy the trend where high-definition videos have become popular by current rapid developments of information and communication technology, ISO/ISE MPEG and ITU-T VCEG have organized JVET (Joint Video Exploration Team) at the 22nd JCT-VC Geneva Conference, and the JVET is actively working to establish a next-generation image coding technology standard for image coding for UHD (ultra-high definition) images which provides clearer quality than HD (high definition) images.

Meanwhile, in in-loop filtering according to a conventional video coding standard technique (HEVC), sample adaptive offset is provided, and an error between a reconstructed image and an original image is minimized by adding an offset value to a reconstructed pixel (or sample).

The conventional sample adaptive offset determined an adaptive offset according to a reconstructed sample by dividing into an edge offset and band offset. In detail, an offset value is adaptively used according to edges formed on the basis of the reconstructed pixel and a pixel band to which the reconstructed pixel belongs.

However, recently, images include various features, and thus determining an offset value by using the conventional edge offset and band offset is restricted in removing an error in a reconstructed image.

DISCLOSURE

Technical Problem

Accordingly, the present invention has been made keeping in mind the above problems occurring in the prior art, and an objective of the present invention is to provide a method of performing in-loop filtering according to an adaptive pixel classification standard.

Technical Solution

In order to accomplish the above object, an aspect of the present invention provides a method of performing in-loop filtering according to an adaptive pixel classification standard A method of performing in-loop filtering on the basis of an adaptive pixel classification standard, wherein the method is performed in an image decoding apparatus, the method includes: classifying a reconstructed sample according to an absolute classification standard or relative classification standard; obtaining offset information on the basis of a result of which reconstructed sample is classified; adding an offset value to the reconstructed sample by referring to the obtained offset information; and outputting the reconstructed sample to which the offset value is added.

Herein, the classifying of the reconstructed samples may include: when the classification standard is the absolute classification, classifying the reconstructed sample according to a band to which a brightness value of the reconstructed samples belongs.

Herein, the classifying of the reconstructed samples may include: when the classification standard is relative classification, classifying the reconstructed sample on the basis of at least one of gradient information and edge information derived by comparing a pixel value of the reconstructed sample with pixel values of neighboring samples adjacent to the reconstructed sample.

Advantageous Effects

When a method of performing sample adaptive offset according to absolute classification or relative classification is used as described above, an error of a reconstructed image can be corrected more precisely.

Also, applying various classification standards can be available, and thus applying offset that matches features of each reconstructed image can be available.

DESCRIPTION OF DRAWINGS

FIG. 7 is a view showing source code where information that is set when performing encoding or decoding on the basis of a tile is explicitly shown.

FIG. 13 is a view of source code showing a syntax element used in sample adaptive offset on the basis of relative classification and absolute classification according to an embodiment of the present invention.

MODE FOR INVENTION

Figure 1:
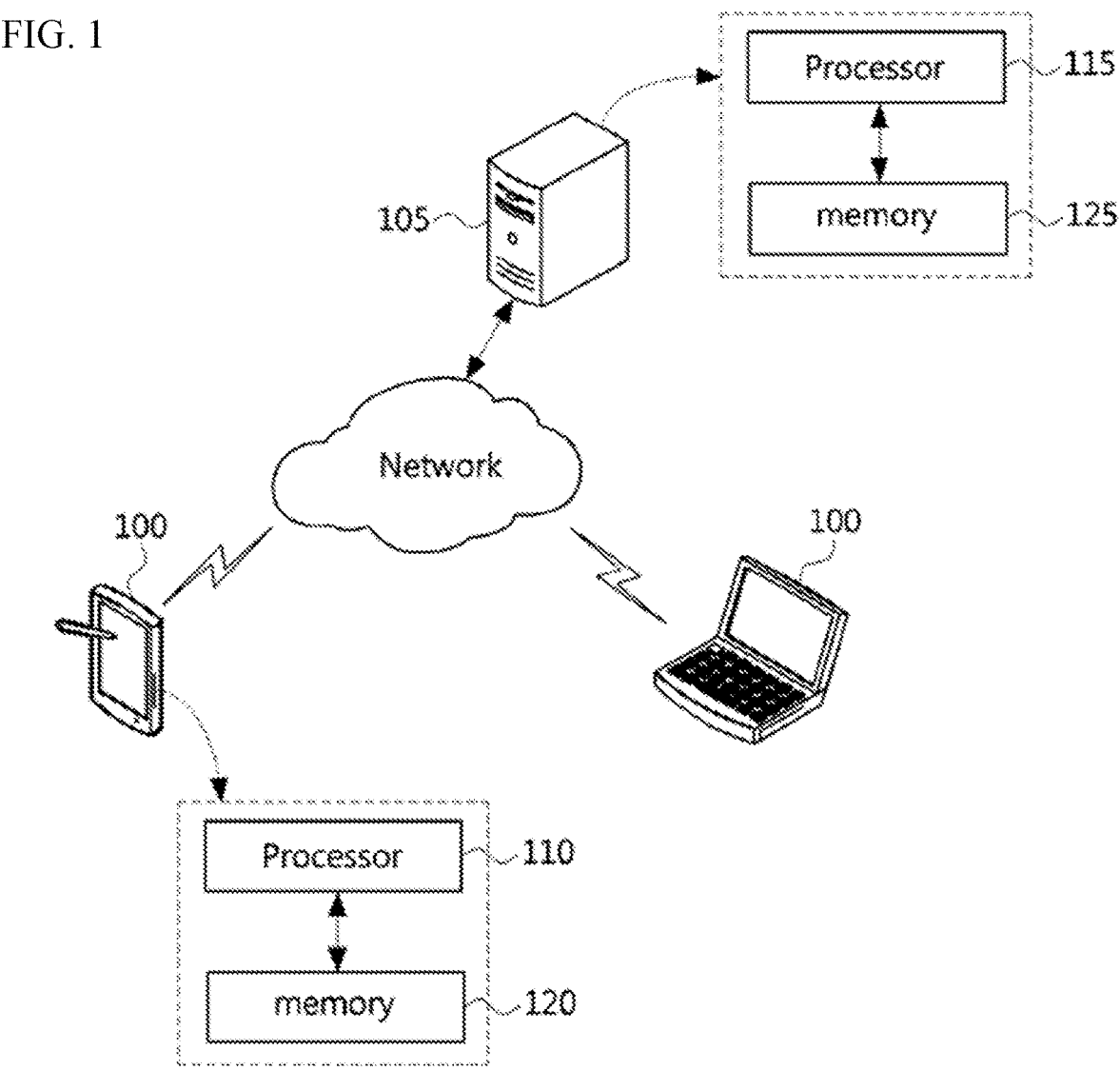
FIG. 1 is view showing a conceptual diagram of an image encoding and decoding system according to an embodiment of the present invention.

Since the present invention may be modified in various forms, and may have various embodiments, the following exemplary embodiments are illustrated in the accompanying drawings, and are described in detail with reference to the drawings. However, this is not intended to limit the present invention to specific embodiments, and the present invention should be construed to encompass various changes, equivalents, and substitutions within the technical scope and spirit of the invention. Like numbers refer to like elements throughout in the description of each drawing.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" "comprising", "includes" and/or "including", when used herein, specify the presence of stated features, an integer, steps, operations, elements, and/or components, but do not preclude the presence or addition of one or more other features, an integer, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Typically, an image may be configured with a series of still images, and the still images may be divided into the basis of a GOP (Group of Pictures), and each still image may be referred to as a picture or frame. As a parent unit, units of a GOP, a sequence, etc. may be present. Also, each picture may be partitioned into units of predetermined regions such as slice, tile, block, etc. Also, one GOP may include units of an I picture, a P picture, a B picture, etc. An I picture may mean a picture that is encoded/decoded as it is without using a reference picture, a P picture and a B picture may mean a picture that is encoded/decoded by performing motion estimation and motion compensation using a reference picture. Generally, in case of a P picture, an I picture and a P picture may be used as a reference picture, and in case of a B picture, an I picture and a P picture may be used as a reference picture, but the same may be defined or changed through encoding/decoding setting.

Herein, a picture referenced when performing encoding/decoding is referred to as a reference picture, and a block or pixel referenced when performing encoding/decoding is referred to as a reference block or reference pixel. Also, reference data may be not only a pixel value in a spatial domain, but also a coefficient value in a frequency domain, and various types of encoding/decoding information generated or determined when performing encoding/decoding.

A minimum unit constituting an image may be a pixel, and a number of bits used for representing one pixel is referred to as a bit depth. Generally, a bit depth may be 8 bits and other bit depths may be supported according to encoding setting. At least one bit depth may be supported according to a color space. Also, configuration may be employed by using at least one color space according to a color format of an image. Configuration may be employed by using one picture having a predetermined size or by using at least one picture having another size according to a color format. For example, in case of YCbCr of 4:2:0, configuration may be employed by one luma component (in the present example, Y) and two chroma components (in the present example, Cb/Cr). Herein, a configuration ratio of the chroma component to the luma component may have a width and a length of 1:2. In another example, in case of 4:4:4, the same may have the same ratio of a width and a length. As the above example, when configuration is employed by using at least one color space, a picture may be partitioned by respective color spaces.

In the present invention, description will be made on the basis of a portion color space (in the present example, Y) of a partial color format (in the present example, YCbCr), and the present invention may be identically or similarly applied (setting dependent on a specific color space) to a different color space (in the present example, Cb, Cr) according to a color format. However, it may also be possible to make partial differences (setting independent of a specific color space) in each color space. In other words, setting dependent on each color space may mean to have setting proportional or dependent on a configuration ratio of each component (for example, determined according to 4:2:0, 4:2:2, 4:4:4, etc.), and setting independent of each color space may mean to have independently setting for the corresponding color space regardless of a configuration ratio of each component. In the present invention, some configurations may have independent or dependent setting according to the encoder/decoder.

Setting information or a syntax element required when encoding an image may be determined on the basis of a video, a sequence, a picture, a slice, a tile, a block, etc. The same may be transmitted to the decoder on the basis of a VPS (video parameter set), an SPS (sequence parameter set), a PPS (picture parameter set), a slice header, a tile header, a block header, etc. by being included in a bitstream, and the setting information transmitted from the encoder may be reconstructed in the decoder by performing parsing on the basis of the same level so as to be used for decoding an image. Each parameter set may have a unique ID value, and a child parameter set may have the ID value of the parent parameter set so as to reference the same. For example, a child parameter set may reference information on the parent parameter set having the ID value that matches among at least one parent parameter set. Among the above-described various examples of units, when any one includes at least one another unit, the corresponding unit may be referred to as a parent unit, and the included unit may be referred to as a child unit.

Setting information generated in the above units may include independent detail setting for each unit, or detail setting dependent on a previous, subsequent or parent unit. Herein, dependent setting may be understood as representing setting information on a corresponding unit by using flag information representing whether or not to use setting of a previous, subsequent, or parent node (for example, being 1 bit flag, using when the flag is 1 and not using when the flag is 0). In the present invention, description will be made on the basis that setting information is independent setting. However, an example of adding or replacing with setting information dependent on a previous, subsequent, or parent unit of a current unit may be also included.

Hereinafter, preferred embodiments of the present invention will be described in detail with reference to the accompanying drawings.

FIG. 1 is view showing a conceptual diagram of an image encoding and decoding system according to an embodiment of the present invention.

Referring to FIG. 1, an image encoding apparatus 105 and an image decoding apparatus 100 may respectively be a user terminal such as personal computer (PC), laptop computer, personal digital assistant (PDA), portable multimedia player (PMP), PlayStation portable (PSP), wireless communication terminal, smart phone, TV, etc., or may be a server terminal such as application server, service sever, etc. Also, the image encoding apparatus 105 and an image decoding apparatus 100 may respectively include various devices configured with: a communication device such as MODEM that performs communication with various devices or wired/wireless communication network; a memory (120, 125) for storing programs and data for performing intra or inter-prediction so as to encode or decode an image; and a processor (110, 115) that execute programs so as to perform calculation and control. Also, an image encoded by the image encoding apparatus 105 into a bitstream may be transmitted in real time or non-real-time to the image decoding apparatus through a wired/wireless communication network such as the Internet, LAN network, wireless LAN network, WiBro network, mobile communication network, etc. or through various communication interfaces such as cable or USB (universal serial bus) so as to be decoded and reconstructed into an image. Also, the image encoded by image encoding apparatus 105 into a bitstream may be transmitted from the image encoding apparatus 105 to the image decoding apparatus 100 through a computer readable recording medium.

Figure 2:
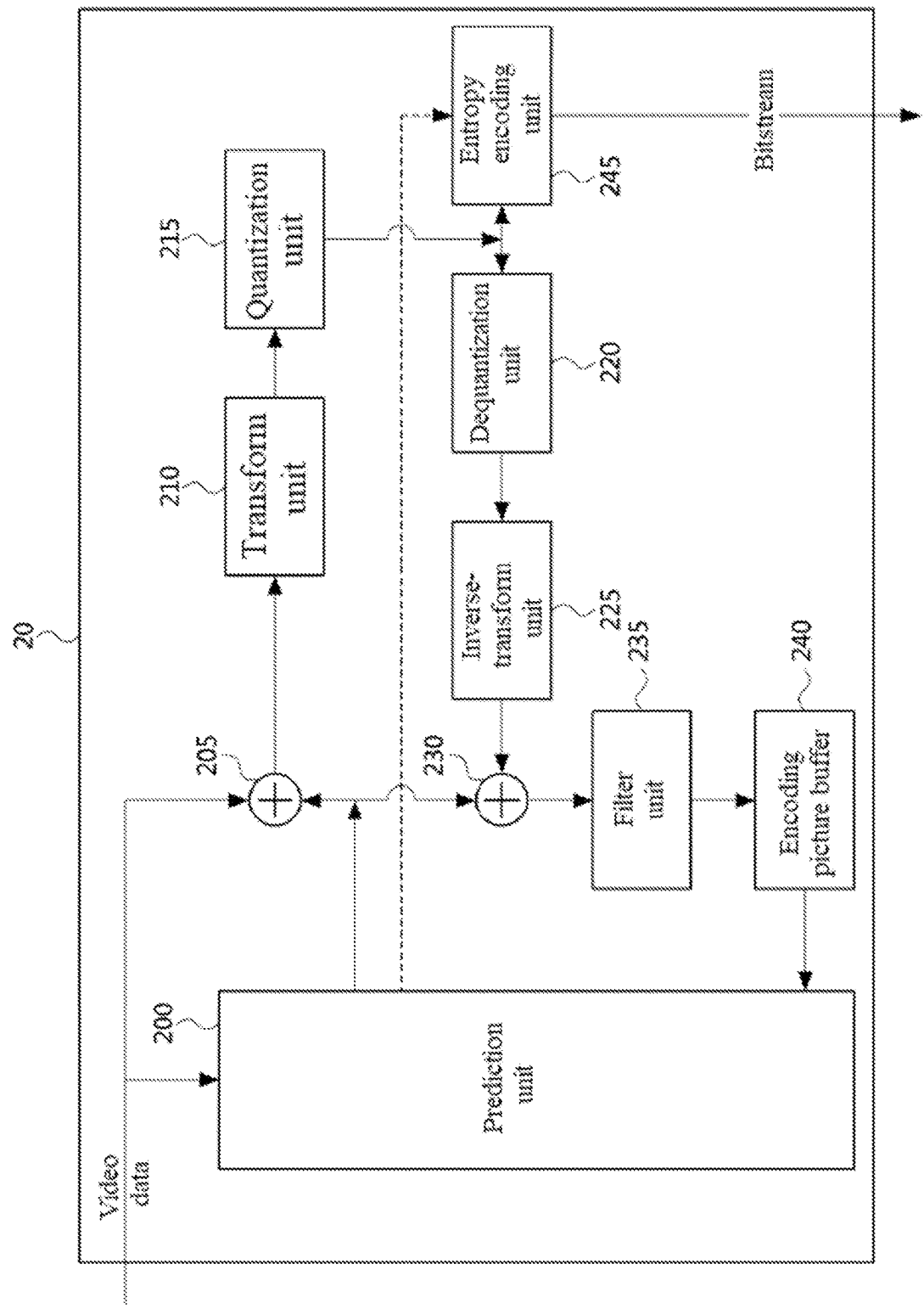
FIG. 2 is view showing a block diagram of an image encoding apparatus according to an embodiment of the present invention.

FIG. 2 is view showing a block diagram of an image encoding apparatus according to an embodiment of the present invention.

An image encoding apparatus 20 according to an example, as shown in FIG. 2, may include a prediction unit 200, a subtractor 205, a transform unit 210, a quantization unit 215, a dequantization unit 220, an inverse-transform unit 225, an adder 230, a filter unit 235, an encoding picture buffer 240, and an entropy encoding unit 245.

The prediction unit 200 may include an intra-prediction unit performing intra-prediction, and an inter-prediction unit performing inter-prediction. In intra-prediction, an intra-prediction mode may be determined by configuring a pixel of a block adjacent to a current block as a reference pixel, and a prediction block may be generated by using the intra-prediction mode. In inter-prediction, motion information on a current block may be determined by using at least one reference image, and a prediction block may be generated by performing motion compensation by using the motion information. Whether intra-prediction or inter-prediction is used for the current block (coding unit or prediction unit) may be determined, and detailed information according to each prediction method (for example, intra-prediction mode, motion vector, reference image, etc.) may be determined. Herein, a processing unit on which prediction is performed, and a processing unit on which a prediction method and detail content are determined, may be determined according to encoding/decoding setting. For example, a prediction method, a prediction mode, etc. may be determined in a prediction unit (or coding unit), and prediction may be performed on the basis of a prediction block (or coding unit, transform unit).

The subtractor 205 generates a residual block by subtracting a prediction block from a current block. In other words, the subtractor 205 generates a residual block that is a residual signal in a block form by calculating a difference between a pixel value of each pixel of the current block to be encoded and a pixel value of a prediction block generated through the prediction unit.

The transform unit 210 transforms each pixel value of a residual block into a frequency coefficient by transforming a residual block into a frequency domain. Herein, the transform unit 210 may transform the residual signal into a frequency domain by using various transform methods, which transform an image signal from a spatial axis into a frequency axis, such as Hadamard transform, DCT based transform, DST based transform, KLT based transform, etc. Herein, the residual signal transformed into a frequency domain becomes a frequency coefficient.

The quantization unit 215 may perform quantization on a residual block having a frequency coefficient that is transformed into a frequency domain by the transform unit 210. Herein, the quantization unit 215 may perform quantization on a transformed residual block by using dead zone uniform threshold quantization, quantization weighted matrix or improved quantization method thereof. As above, at least one quantization method may be present as a candidate, and the method may be determined by an encoding mode, prediction mode information, etc.

The entropy encoding unit 245 generates a quantization coefficient column by performing scanning on the generated quantization frequency coefficient column according to various scanning methods, generates syntax elements of encoding information generated when performing encoding by using various binarization methods (fixed length binarization, unary binarization, truncated rice binarization, k-th order exp-Golomb, etc.), encodes the generated syntax elements by using various entropy encoding methods (context adaptive binary arithmetic coding (CABAC), context adaptive variable length coding (CAVLC), etc.), and outputs the encoded syntax elements. One of various patterns such as zigzag, diagonal, raster, etc. may be set as a scan pattern.

The dequantization unit 220 performs dequantization on a residual block quantized by the quantization unit 215. In other words, the quantization 220 may generate a residual block having a frequency coefficient by performing dequantization on a quantization frequency coefficient column.

The inverse-transform unit 225 may perform inverse-transform on a residual block that is dequantized by the dequantization unit 220. In other words, the inverse-transform unit 225 generates a residual block having pixel values obtained by performing inverse-transform on frequency coefficients of the dequantized residual block, that is, a reconstructed residual block. Herein, the inverse-transform unit 225 may perform inverse-transform by using the transformed method used in the transform unit 210 in a reverse manner.

The adder 230 reconstructs a current block by adding a prediction block predicted in the prediction unit 200, and a residual block reconstructed in the inverse-transform unit 225. The reconstructed current block may be stored in a decoding picture buffer 240 as a reference picture (or reference block) so as to be referenced when encoding another block and picture.

The filter unit 235 may include at least one post processing filtering such as deblocking filter, SAO, adaptive loop filter (ALF), etc. The deblocking filter may remove block distortion occurring in a boundary between blocks in a reconstructed picture. The ALF may perform filtering on the basis of a value obtained by comparing an image reconstructed after block filtering through a deblocking filter, and an original image. The SAO may reconstruct by a pixel an offset difference between a residual block where a deblocking filter is applied thereto and an original image, and may be applied in a form of band offset, edge offset, etc. The above-described post processing filters may be applied to a reconstructed picture or block.

The encoding picture buffer 240 may be for storing a block or picture reconstructed through the filter unit 235. The reconstructed block or picture stored in the decoding picture buffer 240 may be provided to the prediction unit 200 performing intra-prediction or inter-prediction.

Although it is not shown, a partition unit may be further included, and partitioning into a coding unit with various sizes may be available through the partition unit (in detail, block partition unit). Herein, the coding unit may be configured with a plurality of coding blocks according to a color format (for example, one luma coding block, two chroma coding blocks, etc.). For convenience of description, it is assumed that a coding unit of one color component is used. A coding block may have a variable size such as M×M (for example, M is 4, 8, 16, 32, 64, 128, etc.). Also, according to a partition type (for example, partitioning based on a tree: quad-tree partition, binary tree partition, etc.), the coding block may have a variable size such as M×N (for example, M and N are 4, 8, 16, 32, 64, 128, etc.). Herein, the coding block may be a unit becoming a base of intra-prediction, inter-prediction, transform, quantization, entropy encoding, etc.

In the present invention, description will be made in assumption that a plurality of sub-blocks having the same size and shape is obtained according to a partition type. However, application to an asymmetric sub-block (for example, in case of a binary-tree, 4M×4N is partitioned into 3M×4N/M×4N, 4M×3N/4M×N, etc.) is also available. Herein, application to the asymmetric sub-block may be supported by information on whether or not to additionally support the application according to encoding/decoding setting, in addition to a partition type of obtaining symmetrical sub-blocks.

Partitioning the coding block (M×N) may be performed on the basis of a structure based on a recursive tree. Herein, whether or not to perform partitioning may be represented through a partition flag (for example, quad-tree partition flag, binary-tree partition flag). For example, when a partition flag of a coding block having a partition depth of k is 0, encoding a coding block is performed on a coding block having a partition depth of k, and when a partition flag of a coding block having a partition depth of k is 1, encoding a coding block is performed on four sub-coding blocks (quad-tree partition) or two sub-coding blocks (binary-tree partition) having a partition depth of k+1 according to a partition type. Herein, a block size may be (M>>1)×(N>>1) in case of four coding blocks, or (M>>1)×N or M×(N>>1) in case of two coding blocks. The sub-coding block may be partitioned again into child sub-coding blocks (k+2) by being set as a coding block (k+1). Herein, in case of quad-tree partition, one partition flag (for example, flag on whether or not to perform partition) may be supported, and in case of binary-tree partition, at least one (at least two also available) flag (for example, in addition to a flag on whether or not to perform partition, a partition direction flag <horizontal or vertical, omitted in some cases depending on a result of a preceding parent or previous partition>) may be supported.

Block partitioning may be performed starting from a maximum coding block up to a minimum coding block. Alternatively, block partitioning may be performed starting from a minimum partition depth (0) up to a maximum partition depth. In other words, partitioning may be recursively performed until a block size becomes a minimum coding block size, or a partition depth becomes a maximum partition depth. Herein, according to encoding/decoding setting (for example, image <slice, tile> type <I/P/B>, encoding mode <intra/inter>, chroma component <Y/Cb/Cr>, etc.), a maximum coding block size and a minimum coding block size, and a maximum partition depth may be adaptively set.

For example, quad-tree partitioning may be performed in a range of 8×8 to 128×128 when a maximum coding block is 128×128, and binary-tree partitioning may be performed in a range of 4×4 to 32×32 when a maximum partition depth is 3. Alternatively, quad-tree partitioning may be performed in a range of 8×8 to 128×128, and binary-tree partitioning may be performed in a range of 4×4 to 128×128 when a maximum partition depth is 3. The former case may be setting in an I image type (for example, slice), and the latter case may be setting in a P or B image type. As described in the above example, setting on partitioning such as maximum coding block size, minimum coding block size, maximum partition depth, etc. may be common or separately supported according to a partition type of the above-described encoding/decoding setting.

When a plurality of partition types is supported, partitioning may be performed within a block range supported in each partition type, and priorities may be present in the partition types when block ranges supported by respective partition types overlap. For example, quad-tree partitioning may precede binary-tree partitioning. Also, when a plurality of partition types is supported, whether or not to perform subsequent partitioning may be determined according to a result of preceding partitioning. For example, when it is represented to perform partitioning in a result of preceding partitioning, subsequent partitioning may not be performed, and sub-coding blocks obtained by performing the preceding partitioning are again partitioned by being set as a coding block.

Alternatively, when it is represented not to perform partitioning in a result of preceding partitioning, partitioning may be performed according to a result of subsequent partitioning. Herein, when it is represented to perform partitioning in a result of the subsequent partitioning, the partitioned sub-coding blocks are set again as a coding block so that partitioning is performed thereon, and when it is represented not to perform partitioning in a result of the subsequent partitioning, partitioning is not performed further. Herein, in a situation where it is represented to perform partitioning in a result of the subsequent partitioning and thus partitioned sub-coding blocks are again set as a coding block, the subsequent partitioning may be supported while the preceding partitioning is not performed when a plurality of partition types is supported (for example, when block ranges supported by respective partition types overlap). In other words, when a plurality of partition types is supported, and it is represented not to perform partitioning in a result of preceding partitioning, it means that the preceding partitioning is not performed further.

For example, when quad-tree partitioning and binary-tree partitioning are available, first, a quad-tree partition flag of a coding block of M×N may be checked. When the above partition flag is 1, partitioning into four sub-coding blocks of a (M>>1)×(N>>1) size may be performed, and the sub-coding blocks are again set as a coding block so that partitioning (quad-tree partitioning or binary-tree partitioning) may be performed thereon. When the above partition flag is 0, a binary-tree partition flag may be checked, and when the corresponding flag is 1, partitioning into two sub-coding blocks of a (M>>1)×N or MX(N>>1) size may be performed, and the sub-coding blocks are set again as a coding block so that partitioning (binary-tree partition) may be performed thereon. When the above partition flag is 0, partitioning is ended and encoding is performed.

A case where a plurality of partition types is supported has been described with the above example. However, it is not limited thereto, various partition types and a combination thereof may be available. For example, a partition type of quad-tree/binary-tree/quad-tree+binary-tree, etc. may be used. Herein, a default partition type may be set as a quad-tree type, and an additional partition type may be set as a binary-tree type, and information on whether or not an additional partition type is supported may be implicitly determined, or explicitly included on the basis of a sequence, a picture, a slice, a tile, etc.

In the above example, information on a coding block size, a range supported by a coding block, information on a maximum partition depth, etc. may be included on the basis of a sequence, a picture, a slice, a tile, etc., or may be implicitly determined. In short, an available block range may be defined by a maximum coding block size, a supported block range, a maximum partition depth, etc.

A coding block obtained by performing partitioning through the above process may be set as a maximum size for intra-prediction or inter-prediction. In other words, a coding block where block partitioning has been completed may become a size from which partitioning a prediction block starts for intra-prediction or inter-prediction. For example, when a coding block is 2M×2N, a prediction block may have a size identical or smaller size of 2M×2N, or M×N. Alternatively, a prediction block may have a size of 2M×2N, 2M×N, M×2N, or M×N. Alternatively, a prediction block may have size identical to the size of the coding block which is 2M×2N. Herein, the coding block having the same size with the prediction block may mean that partitioning on the prediction block is not performed and prediction is performed in a size obtained by partitioning the coding block. In other words, it means that partition information on the prediction block is not generated. The above-described setting may be applied to a transform block, and transform may be performed on the basis of a coding block.

Various configurations may be available according to the following encoding/decoding setting. For example, (after a coding block being determined) at least one prediction block and at least one transform block may be obtained on the basis of the coding block. Alternatively, one prediction block having the same size with a coding block may be obtained, and at least one transform block may be obtained on the basis of the coding block. Alternatively, one prediction block and one transform block which have the same size with a coding block may be obtained. In the above example, when at least one block is obtained, partition information on each block may be present (generated), and when one block is obtained, partition information on each block may not be present.

A block of a square or rectangle shape with various sizes which is obtained according to the above result may be a block used when performing intra-prediction and inter-prediction, may be a block used when performing transform and quantization on a residual component, and may be a block used when performing filtering on a reconstructed pixel.

Meanwhile, for a block unit to which filtering (for example, SAO, etc.) of a reconstructed pixel is applied, a maximum coding block (for example, M×M) may be used as a default unit. However, filtering may be applied on the basis of a coding block (for example, a coding block obtained according to partition, etc., or a filter unit may be supported separately) having the above-described various block sizes and shapes (for example, M×N, M/2×M/2, N×N/2, etc.). This means that filtering-related information is generated on the basis of a block.

Alternatively, the partition unit may further include, in addition to the above-described block partition unit performing block partitioning, a picture partition unit. The picture partition unit may partition a picture into at least one processing unit (for example, color space <YCbCr, RGB, XYZ, etc.>, slice, tile, block, etc.), the block partition unit may partition a maximum (or default) coding unit into at least one processing unit (for example, encoding, prediction, transform, quantization, entropy, or in loop filtering processing unit). Herein, a tile is a set of coding blocks, and means a rectangle region obtained by partitioning one picture into horizontal and vertical directions, and a slice means a region configured with a set of continuous coding blocks according to a scan order of the coding blocks.

Configuration may be employed by using at least one color space according to a color format of an image. For example, in case of YCbCr, the same may be configured with one luma component and two chroma components. Also, a ratio between a height and a width of a color component may be determined according to a color format. For example, in case of YCbCr of 4:2:0, a height and a width of a chroma component may be half of a height and a width of a luma component, and in case of YCbCr of 4:4:4, a height and a width of a chroma component may have the same size with a luma component. When configuring is employed by using at least one color component as above, a picture may be partitioned into respective color spaces. Also, each color space may be partitioned into a maximum coding block.

Also, a picture may be partitioned into at least one tile. In detail, a picture may be partitioned into a horizontal column (or vertical column), and into a vertical column (or horizontal column) so as to obtain at least one tile. Also, each tile may be partitioned into at least one tile segment. Also, each tile segment may be partitioned into a maximum coding unit.

Also, a picture may be partitioned into at least one slice. Each slice may be partitioned into at least one slice segment. Also, each slice segment may be partitioned into a maximum coding unit.

Some of the above units may not necessarily be included, some or all of the units may be selectively included according to encoding/decoding setting, and an additional unit may be included.

A default coding unit obtained through the picture partition unit may be partitioned into a default coding block according to a color space, and a size and a shape thereof may be determined according to a feature and a resolution of an image. A size or shape of a supported block may be an N×N square (2n×2n: 256×256, 128×128, 64×64, 32×32, 16×16, 8×8, 4×4, etc., n is an integer between 2 to 8) whose a height length and a width are represented by an exponential power of $2(2^n)$, or an M×N rectangle (2m×2n). For example, in case of an 8k UHD image with high resolution, an input image may be partitioned into a size of 256×256, in case of 1080p HD image, an input image may be partitioned into a size of 128×128, and in case of a WVGA image, an input image may be partitioned into a size of 16×16.

Information on a size or shape of a block may be transmitted by being included in a bitstream on the basis of a sequence, a picture, a slice, a tile, etc. Accordingly, the information may be reconstructed by performing parsing in the decoder.

Figure 3:
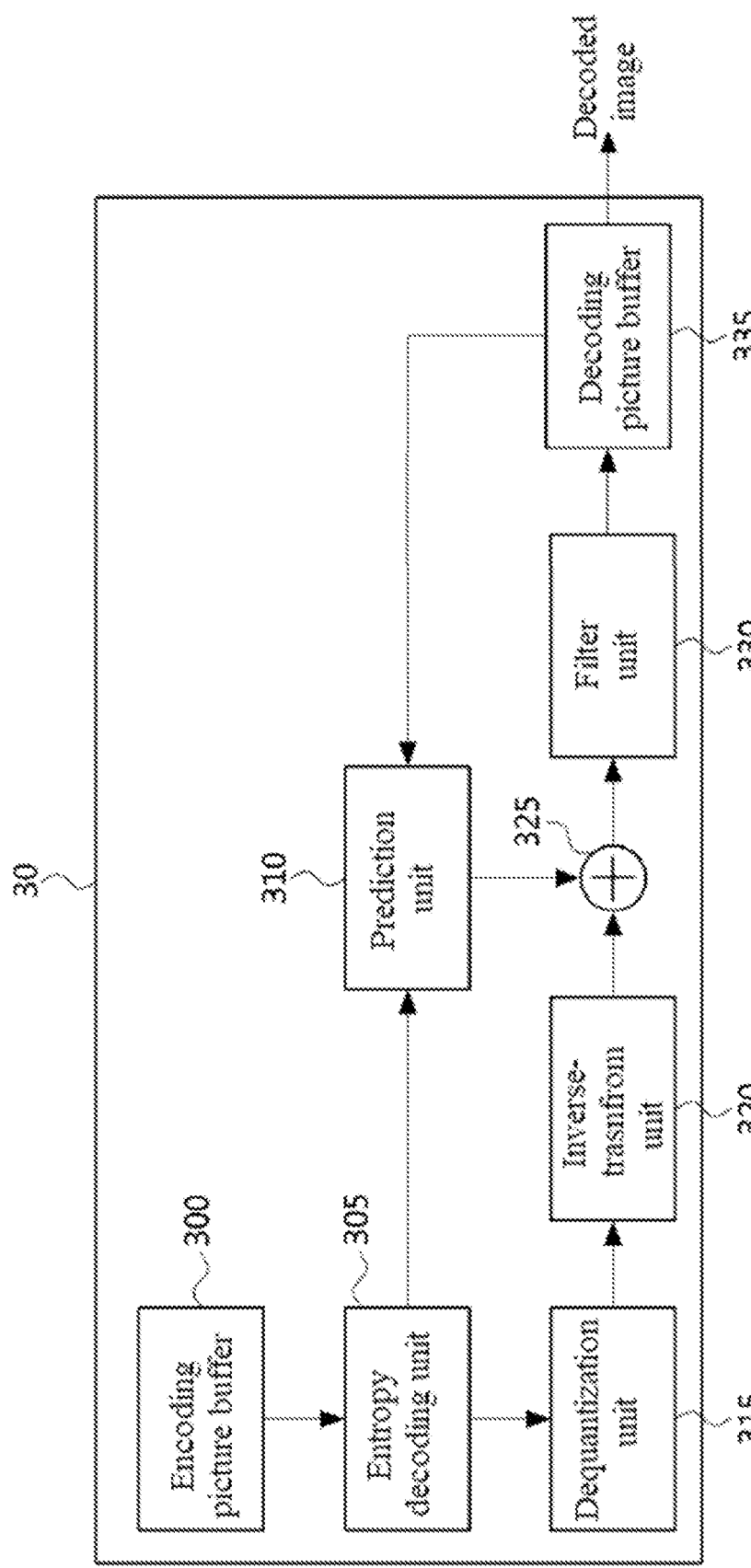
FIG. 3 is view showing a block diagram of an image decoding apparatus according to an embodiment of the present invention.

FIG. 3 is view showing a block diagram of an image decoding apparatus according to an embodiment of the present invention.

Referring to FIG. 3, an image decoding apparatus 30 may include an entropy decoding unit 305, a prediction unit 310, a dequantization unit 315, an inverse-transform unit 320, an adder 325, a filter unit 330, and a decoding picture buffer 335.

Also, the prediction unit 310 may include an intra-prediction module and an inter-prediction module.

The entropy decoding unit 305 may receive a quantization coefficient column, a transform coefficient column, or a signal column from a bitstream transmitted from the image encoding apparatus 20, and decode the same by using an entropy decoding method (CABAC, CAVLC, etc.). Data obtained by receiving syntax elements on decoding information may be transmitted to the prediction unit 310.

The prediction unit 310 may generate a prediction block on the basis of data transmitted from the entropy decoding unit 305. The prediction unit 310 performs the same process as the above-described prediction unit 200 of the image encoding apparatus 20.

The dequantization unit 315 may perform dequantization on quantized transform coefficients that are provided from the bitstream and decoded in the entropy decoding unit 305.

The inverse-transform unit 320 may generate a residual block by applying to transform coefficients inverse-transform methods such as inverse-DCT, inverse integer transform, or a concept similar thereto.

Herein, the dequantization unit 315 and the inverse-transform unit 320 may be employed in various methods by performing the above-described processes performed in the transform unit 210 and the quantization unit 215 of the image encoding apparatus 20 in a reverse manner. For example, the same process and inverse-transform shared with the transform unit 210 and the quantization unit 215 may be used, or transform and quantization may be performed in a reverse manner by using information on transform and quantization (for example, a transform size, a transform shape, a quantization type, etc.) transmitted from the image encoding apparatus 20.

A residual block on which dequantization and inverse-transform are performed may be added to a prediction block derived in the prediction unit 310 so as to generate a reconstructed image block. The above addition may be performed by the adder 325.

The filter unit 330 may apply a deblocking filter to a reconstructed image block so as to remove blocking artifact when necessary, and may additionally use other loop filters before and after performing decoding so as to improve video quality.

An image block on which reconstruction and filtering are performed may be stored in the decoding picture buffer 335.

Although it is not shown, the image decoding apparatus 30 may further include a partition unit. Herein, the partition unit may be configured with a picture partition unit and a block partition unit. The partition unit may be easily understood by a person skilled in the art in the same or corresponding configuration as that of the image encoding apparatus of FIG. 2, and thus a detailed description thereof will be omitted.

In image encoding/decoding, an input pixel value may differ from an output pixel value, and thus adjustment may be performed on a pixel value so as to prevent distortion due to a calculation error. A method of adjusting a pixel value is adjusting a pixel value that exceeds a range of the pixel value to be within the range of the pixel value, and may be called clipping.

TABLE 1 pixel_val' = Clip_x (pixel_val, $min_I$, $max_I$)
Clip_x (A, B, C)
{
    if( A < B ) output = B;
    else if( A > C ) output = C;
    else output = A;
}

Table 1 shows exemplary code of a clipping function (Clip_x) in which adjusting is performed on a pixel value. Referring to Table 1, an input pixel value (pixel_val), and the minimum value ($min_I$) and the maximum value ($max_I$) of an available range of a pixel value may be input as parameters of the clipping function (Clip_x). Herein, describing on the basis of a bit depth (bit_depth), the minimum value ($min_I$) is 0, and the maximum value ($max_I$) may be $2^{bit\_depth}-1$. When the clipping function (Clip_x) is performed, an input pixel value (pixel_val, parameter A) smaller than the minimum value ($min_I$, parameter B) is changed to the minimum value ($min_I$), and an input pixel value greater than the maximum value ($max_I$, parameter C) is changed to the maximum value ($max_I$). Accordingly, an output value (output) may be returned to an output pixel value (pixel_val') where adjusting the pixel value is completed.

Herein, a range of the pixel value is determined according to a bit depth. However, the pixel value constituting an image (for example, picture, slice, tile, block, etc.) varies according to a type and a feature of the image, and thus does not necessarily present within the entire pixel value ranges. According to an embodiment of the present invention, a range of a pixel value practically constituting an image may be used when performing image encoding/decoding by using the range.

For example, in a method of adjusting a pixel value according to Table 1, for the minimum value ($min_f$) of the clipping function, the smallest value among pixel values practically constituting an image may be used, and for the maximum value ($max_f$) of the clipping function, the greatest value among pixel values practically constituting an image may be used.

In short, the image encoding/decoding apparatus may perform a method of adjusting a pixel value on the basis of a bit depth and/or a method of adjusting a pixel value on the basis of a range of the pixel value constituting an image. In the encoder/decoder, flag information determining whether or not a method of adaptively adjusting a pixel value is supported may be supported. When the corresponding flag information is "1", information on selecting a method of adjusting a pixel value may be present, and when the corresponding flag information is "0", a preset method of adjusting a pixel value (in the present example, bit depth-based method) may be used as a default method of adjusting a pixel value. When the information on selecting the method of adjusting the pixel value indicates a method of adjusting a pixel value on the basis of a range of the pixel value constituting an image, information on a pixel value of an image may be included. For example, the information may be information on a minimum value and a maximum value of each image, and a median value that will be described later according to a color component, and an example thereof. Information generated when adjusting a pixel value may be transmitted in the encoder by being included on the basis of a video, a sequence, a picture, a slice, a tile, a block, etc., and the information may be reconstructed in the decoder on the basis the same level by performing parsing.

Meanwhile, a range of a pixel value which includes the minimum value and the maximum value of the pixel value may be changed (determined or defined) through the above process on the basis of a method of adjusting a pixel value on the basis of a bit depth or a method of adjusting a pixel value on the basis of a pixel value constituting an image, and information on an additional pixel value range may be changed (determined or defined). For example, the maximum value and the minimum value of a pixel value practically constituting an image may be changed, and a median value of the pixel value practically constituting the image may be also changed.

In other words, in a method of adjusting a pixel value according to a bit depth, minI may mean the minimum pixel value of an image, maxI may mean the maximum pixel value of the image, I may mean a color component, and medianI may mean the median pixel value of the image. minI may be 0, maxI may be (1<<bit_depth)−1, medianI may be 1<<(bit_depth−1), and median may be obtained in another form according to encoding/decoding setting including the above example. The median value is just one term used for description in the present invention, and may be one piece of information representing information on a pixel value range that may be changed according to the above described method of adjusting the pixel value when performing image encoding/decoding.

For example, in a method of adjusting a pixel value according to a range of a pixel value constituting an image, minI may be the minimum pixel value of the image, maxI may be the maximum pixel value of the image, and medianI may be the median pixel value of the image. medianI may be an average of pixel values within the image, may be a value positioned at the center when aligning pixels of the image, or may be a value obtained according to information on a pixel value range of the image. medianI may be derived from at least one of minI and maxI. In other words, medianI may be one pixel value present within the pixel value range of the image.

In detail, medianI may be a value obtained according to information on a range of a pixel value (in the present example minI, maxI) of the image such as (minI+maxI)/2 or (minI+maxI)>>1, (minI+maxI+1)/2, (minI+maxI+1)>>1 m etc., and median may be obtained in another form according to encoding/decoding setting by including the example.

The following describes an embodiment (in the present example, median value) according to a method of adjusting a pixel value.

In an example, when a default bit depth is 8 bits (0 to 255), a method of adjusting a pixel value on the basis of a range of a pixel value constituting an image is selected (in the present example, the minimum value is 10, the maximum value is 190, and the medial value is 100 under setting (average) that the same is derived from the minimum value and the maximum value), and a position of a current block is the first block within the image (in the present example, picture), a reference pixel may be determined as the median value of 100 as neighboring blocks (in the present example, left, lower left, upper left, upper, and upper right blocks) used for encoding/decoding are not present. Intra-prediction may be performed according to a prediction mode by using the reference pixel.

In an example, when a default bit depth is 10 bits (0 to 1023), a method of adjusting a pixel value on the basis of a range of a pixel value constituting an image is selected (in the present example, the medial value of 600, and related syntax element is present), and a position of a current block is the first block within the image (in the present example, slice, tile), a reference pixel may be determined as the median value of 600 as neighboring blocks (in the present example, left, lower left, upper left, upper, and upper right blocks) used for encoding/decoding are not present. Intra-prediction may be performed according to a prediction mode by using a reference pixel.

In an example, when a default bit depth is 10 bits, a method of adjusting a pixel value on the basis of a range of a pixel value constituting an image is selected (in the present example, the median value of 112, and related syntax element constituting the image is present), setting of whether or not using a pixel of a corresponding block is available for prediction of a current block according to an encoding mode (intra-prediction/inter-prediction) of a neighboring block is activated (In the present example, when an encoding mode of the corresponding block is intra-prediction, using as a reference pixel of the current block is available, and when the encoding mode of the corresponding block is inter-prediction, using as a reference pixel of the current block is not available. When the above setting is deactivated, using as a reference pixel of the current block is available regardless of an encoding mode of the corresponding block. Related syntax element is constrained_intra_pred_flag, and may be generated in a P or B image type.), and the current block is positioned in the left of the image, a reference pixel becomes the median value of 112 as a usable reference pixel is not present when the encoding mode of the corresponding block is inter prediction, and thus usage is not allowed by the above setting even though neighboring blocks (in the present example, left, lower left, and upper left blocks) used for encoding/decoding are not present but neighboring blocks (in the present example, upper, and upper right blocks) used for encoding/decoding are present. In other words, a median value within a range of an image pixel value is used as usable reference pixels are not present. Intra-prediction may be performed according to a prediction mode by using the reference pixel.

In the above example, various cases related in the median value in the prediction unit are described, but the same may be included in another configuration of the image encoding/decoding apparatus. Also, it is not limited to the above embodiments but may be modified and expanded in various cases.

In the present invention, a method of adjusting a pixel value may be applied to the prediction unit, the transform unit, the quantization unit, the dequantization unit, the inverse-transform unit, the filter unit, the memory, etc. of the encoding/decoding apparatus. For example, in a method of adjusting a pixel value, an input pixel may be a reference pixel (reference sample) or a prediction pixel (prediction sample) in prediction, or may be a reconstructed pixel (reconstructed sample) in transform, quantization, inverse-transform, and dequantization. Also, an input pixel may be a reconstructed pixel in in-loop filtering, or a storage pixel (storage sample) in the memory. Herein, a reconstructed pixel in transform and quantization, and reverse thereof may mean a reconstructed pixel before in-loop filtering being applied thereto. A reconstructed pixel in in-loop filtering may mean a reconstructed pixel after in-loop filtering being applied thereto. A reconstructed pixel in deblocking filtering may mean a reconstructed pixel after deblocking filtering being applied thereto. A reconstructed pixel in SAO may mean a reconstructed pixel after SAO being applied thereto. A reconstructed pixel in ALF may mean a reconstructed pixel after ALF being applied thereto. As described above, examples of the various cases have been described, but are not limited thereto. Application to input, intermediate, and output stages of the entire encoding/decoding where pixel value adjustment is used can be available.

Figure 4A:
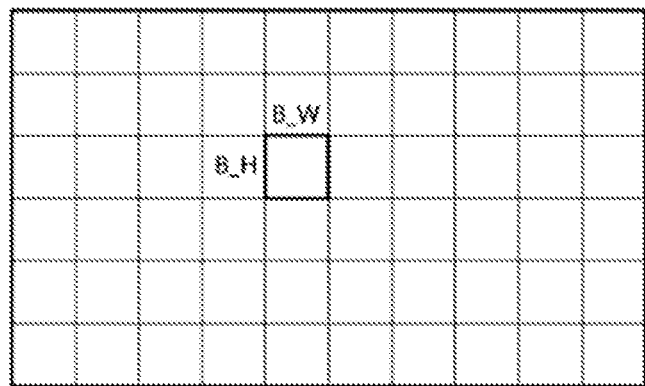
FIGS. 4a to 4c are views showing examples of a block, a tile, and a slice, respectively, which are used in the image encoding/decoding apparatus according to an embodiment of the present invention.
Figure 4B:
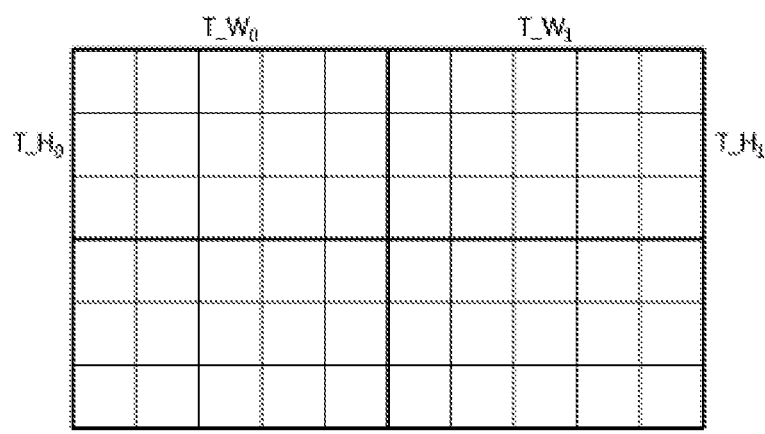
Figure 4C:
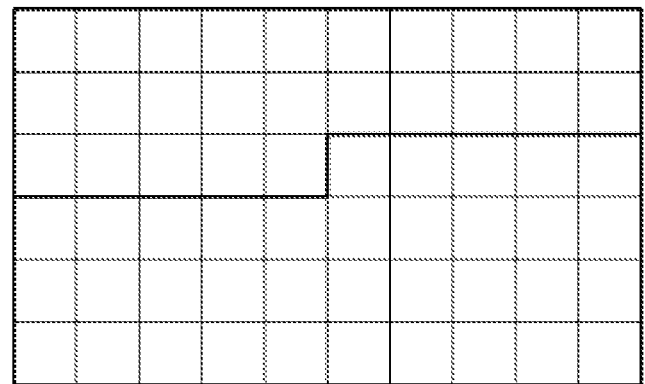

FIGS. 4a to 4c are views showing examples of a block, a tile, and a slice, respectively, which are used in the image encoding/decoding apparatus according to an embodiment of the present invention.

Referring to FIG. 4a, blocks are shown which are obtained by partitioning a picture in a vertical direction and a horizontal direction by a predetermined length (in the present example, B_W, B_H). Herein, the block may be a default coding unit (or maximum coding unit) obtained by the picture partition unit, and the block may become a unit applied to a tile, a slice, etc.

Referring to FIG. 4b, tiles are shown which are obtained by partitioning a picture in at least one direction of a vertical direction and a horizontal direction. Independent encoding/decoding may be performed on a tile which differs from another region (another tile, etc.) or partially dependent encoding/decoding may be performed. As shown in FIG. 4b, a tile may be configured with groups of spatially adjacent blocks (in the present example, a width (T_W0) and a height (T_H0) of a first tile, a width (T_W1) and a height (T_H1) of a second tile). When partitioning in any one direction of a vertical direction and a horizontal direction is not performed, one tile may be one picture.

Referring to FIG. 4c, slices may be obtained by partitioning a picture into groups of continuous blocks. Independent encoding/decoding may be performed on a slice which differs from another region (another slice, etc.) or partially dependent encoding/decoding may be performed. Groups of continuous blocks may be determined according to a scan order, generally, a raster scan order, but the scan order may be defined according to setting in the encoder/decoder. When all blocks present within a picture are grouped into one, one slice may be one picture.

Figure 5A:
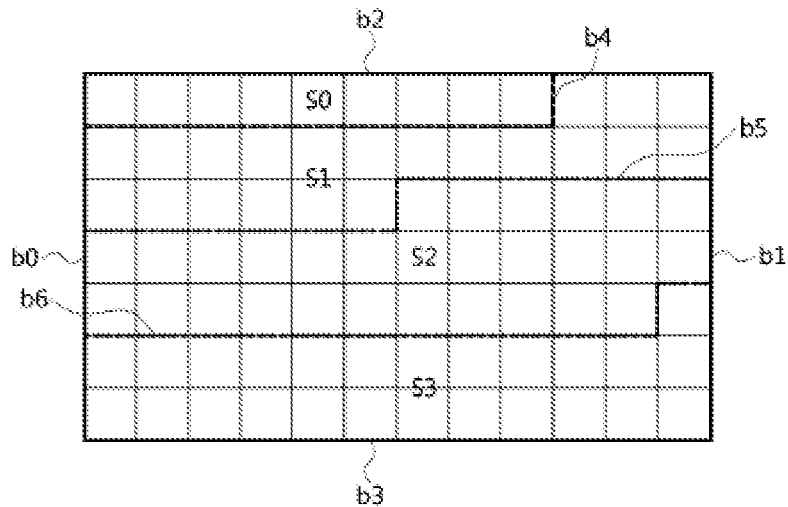
FIGS. 5a and 5b are views showing an example of generating a slice by grouping continuous blocks according to a scan order according to an embodiment of the present invention.
Figure 5B:
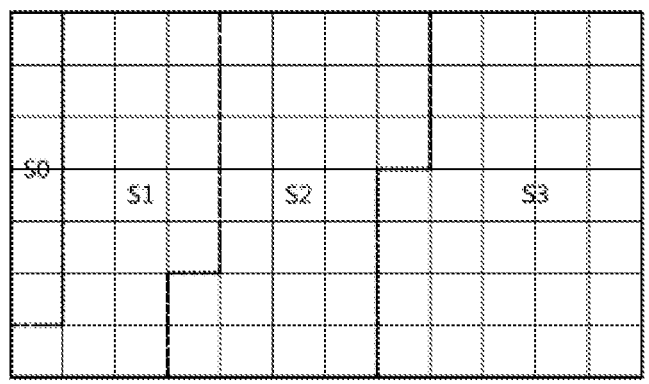

FIGS. 5a and 5b are views showing an example of generating a slice by grouping continuous blocks according to a scan order according to an embodiment of the present invention.

In encoding/decoding a picture, a raster scan order may be used, but at least one of scan order candidates may be selected and used, and the same may be defined according to encoding/decoding setting. Herein, the scan order may be determined by: determining a scan start point; determining a primary scan order according to one direction of a horizontal direction and a vertical direction on the basis of the scan start point; and determining a secondary scan order according to a direction that is not selected in the primary scan order (remaining one of the horizontal direction and the vertical direction). Herein, the scan start point may be one of the uppermost left, the lowest left, the uppermost right, and the lowest right points in a reference region such as picture, etc.

Referring to FIG. 5a, an example is shown where the uppermost left point of a picture is set as a scan start point, a direction moving from the left to the right is set as a primary scan order, and a direction moving from the upper to the lower (top to bottom) is set as a secondary scan order. A raster scan may be a scan order shown in FIG. 5a, when performing grouping on continuous blocks according to the above order, a first slice S0, a second slice S1, a third slice S2, and a fourth slice S3 may be obtained.

Referring to FIG. 5b, an example is shown where the uppermost left point of a picture is set as a scan start point, a direction moving from the upper to the lower is set as a primary scan order, and a direction moving from the left to the right is set as a secondary scan order. When performing grouping on continuous blocks according to a scan order of FIG. 5b, a first slice S0, a second slice S1, a third slice S2, and a fourth slice S3 having different shapes from those of FIG. 5a may be obtained.

FIGS. 6a to 6d are views respectively showing examples of tiles within a picture and a default coding unit.

Figure 6A:
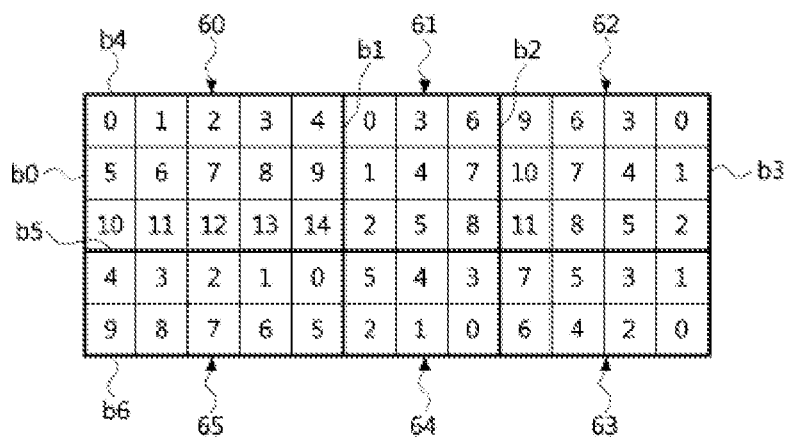
FIGS. 6a to 6d are views respectively showing examples of tiles within a picture and a default coding unit.

According to an embodiment of the present invention, pictures may be respectively partitioned into at least one vertical column and at least one row so as to generate tiles, and encoding/decoding may be performed on the basis of a tile. In FIG. 6a, a picture may be partitioned into tiles by a boundary of a vertical column (internal boundary: b1 and b2) and a boundary of a horizontal row (internal boundary: b5). Regions respectively surrounded by at least one boundary of vertical column boundaries (internal boundary: b1 and b2) and at least one boundary of horizontal row boundaries (internal boundary: b5) become tiles. In case of locating outside of an image, a boundary of a vertical column (external boundary: b0 and b3) and a boundary of a horizontal row (external boundary: b4, b6) may be additionally considered. Tiles obtained through the above process may have a rectangle shape, and may have a square shape according to setting in the encoder/decoder such as feature, format, etc. of an image.

Tiles generated by partitioning a picture in a vertical column boundary and a horizontal row boundary may respectively include a plurality of blocks. The vertical column boundary and the horizontal row boundary used for partitioning the picture pass along boundaries of neighboring blocks, and thus partitioning each block is not performed. Accordingly, each tile may include a number of blocks, the number being an integer. When the tile is not configured with a number of blocks, the number being integer, expansion may be performed such that a number of blocks, the number being an integer, may constitute a picture or tile which is a parent unit. Accordingly, processing is performed on each tile of a picture, while in each tile, encoding/decoding is performed on the basis of a block.

When a picture is partitioned into at least one tile, information on tile partitioning (for example, location of vertical column boundary and horizontal row boundary <or width and height of each tile according thereto> or information on uniform/non-uniform partition, etc.) may be transmitted on the basis of a sequence, a picture, etc. by being included in a bitstream. When decoding a picture, information on tile partitioning may be obtained by performing parsing on the basis of a sequence, a picture, etc., each region of the picture may be reconstructed by performing decoding on each tile, and one picture may be reconstructed by using respective regions through information on tile partition.

In case of a tile, in order to perform processing in real time on a large amount of data for an image having a high resolution, encoding/decoding may be performed by performing partitioning into at least one tile. Herein, a large image is partitioned into small multiple images, and setting information required for encoding/decoding each tile may be assigned through a parent unit (for example, picture, PPS). For example, header information may not be generated and transmitted on the basis of a tile, and information on encoding/decoding setting may be referenced through a PPS.

Additional information, in addition to information on tile partition, may be transmitted by being included in a parent unit such as video, sequence, picture, etc. Herein, additional information may be at least one piece of information on encoding/decoding setting required when performing encoding/decoding on the basis of a tile.

Alternatively, information on tile partitioning and additional information may be transmitted by being included on the basis of a tile. This differs from using encoding/decoding setting determined in a parent unit in that encoding/decoding is performed by using encoding/decoding setting determined in a tile unit. In detail, there is a difference from using one type of encoding/decoding setting determined in a parent unit.

For example, header information may be generated and transmitted on the basis of a tile, or at least one piece of information on encoding/decoding setting may be referenced through a PPS. Herein, a PPS may include at least one candidate set of information on encoding/decoding setting based on a tile.

As described above, information on encoding/decoding setting based on a tile may include information required when performing encoding/decoding on the tile such as tile type (I/P/B), information on a reference picture list of the tile, information on a quantization parameter (QP) of the tile, in-loop filtering control based on a tile, scan order, whether or not to perform encoding/decoding, etc.

Referring to FIG. 6a, an example is shown where an independent scan order is applied on the basis of a tile. Accordingly, an initial block from which encoding/decoding starts may vary according to a scan order determined on the basis of a tile. In FIG. 6a, a numerical value represented in each block represents a scan order of blocks within a tile, that is, an order through which the blocks are encoded/decoded. Also, FIG. 6a shows an example where at least one scan order is applied to each tile. When it is represented that a scan order within a tile is determined according to <scan start point/primary scan order/secondary scan order>, a first tile 60 may have a scan order (or encoding/decoding order) determined according to <upper left/left->right/upper->low>, a second tile 61 according to <upper left/upper->low/left->right>, a third tile 62 according to <upper right/upper->low/right->left>, a fourth tile 63 according to <low right/low->upper/right->left>, a fifth tile 64 according to <low right/right->left/low->upper>, and a sixth tile 65 according to <upper right/right->left/upper->low>.

Partitioning on a tile and a tile segment may be performed on the basis of a first scan order (for example, a scan order of a picture: Z-scan order, etc.), and encoding/decoding on the tile and the tile segment may be performed according to the first scan order (for example, performing encoding/decoding on a tile, block, etc. according to a scan order of the picture). Alternatively, partitioning on a tile and a tile segment is performed on the basis of a first scan order, and encoding/decoding on the tile and the tile segment may be performed according to a second scan order (for example, independent scan orders based on a tile). Herein, the second scan order may be the same or vary depending on each tile and tile segment.

Figure 6B:
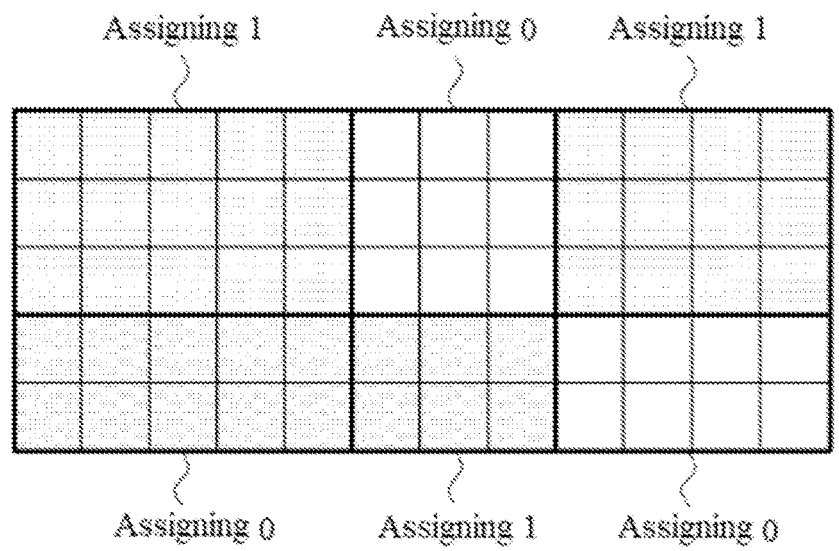

Referring to FIG. 6b, an example is shown where encoding/decoding is selectively performed on the basis of a tile, and 0 or 1 indicating whether or not to encode/decode each tile according to the example of FIG. 6a may be assigned. Herein, an arbitrary pixel or data obtained from a region on which encoding/decoding is performed may be used for a tile on which encoding/decoding is not performed. The arbitrary pixel may be one pixel belonging to a pixel range that may be represented by a bit depth transmitted through a bitstream, and information thereof may be determined and included so as to be transmitted. Also, the arbitrary pixel may be a preset pixel determined according to setting commonly set in the encoder/decoder (for example, Min, Median, or Max of a pixel range).

Also, in setting where encoding/decoding partially depending on tiles is available, data obtained from an adjacent tile on which encoding/decoding is performed may be referenced when encoding/decoding a corresponding tile.

For example, data of at least one pixel positioned in a boundary of an adjacent tile on which encoding/decoding is performed may be referenced when encoding/decoding a partial region belonging to a current tile by storing the data in a temporary memory.

Alternatively, according to a feature, a type, etc. of an image determined in a parent unit (For example, in performing encoding/decoding by transforming a three-dimensional spatial image such as omnidirectional image (or 360-degree virtual reality image) into a two-dimensional space, when partitioning into a plurality units (or faces) is performed according to encoding/decoding setting such as projection format, etc., regions adjacent in three-dimensional space may have spatial correlations. Herein, units spatially adjacent in a two-dimensional space according to arrangement of units (or faces) in the two-dimensional space when performing spatial transform (three-dimension->two-dimension) do not necessarily have spatial correlations. In other words, units spatially adjacent in a two-dimensional space may have or not spatial correlations, and units that are not spatially adjacent may have or not spatial correlations. Accordingly, whether or not spatial correlation is present may be determined through information on encoding/decoding setting for a 360-degree image), data of a region on which encoding/decoding is performed and which has spatial correlation may be used as reference data. Herein, the reference data may be used for a memory copy method of copying a predetermined region as it is so as to obtain the same, or may be used for a method of obtaining through a series of transform processes.

Figure 6C:
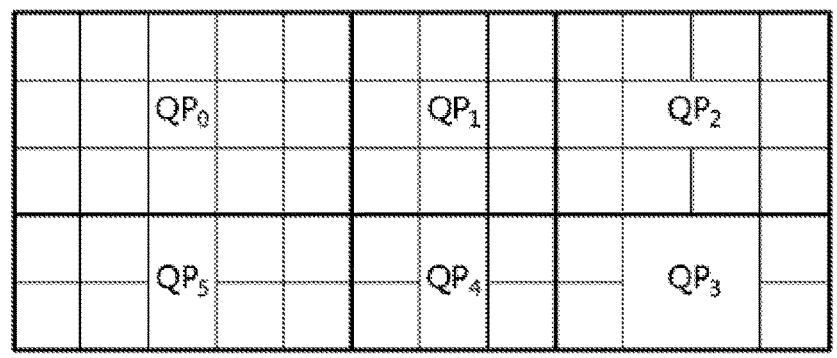

Referring to FIG. 6c, an example is shown where an independent QP (quantization parameter) is applied on the basis of a tile, quantization may be performed by applying QP0 to QP5 which are independent quantization parameters to respective tiles. Herein, the quantization parameter may be represented through information on a difference value with a QP set in a parent unit (picture, etc.) of the tile.

Figure 6D:
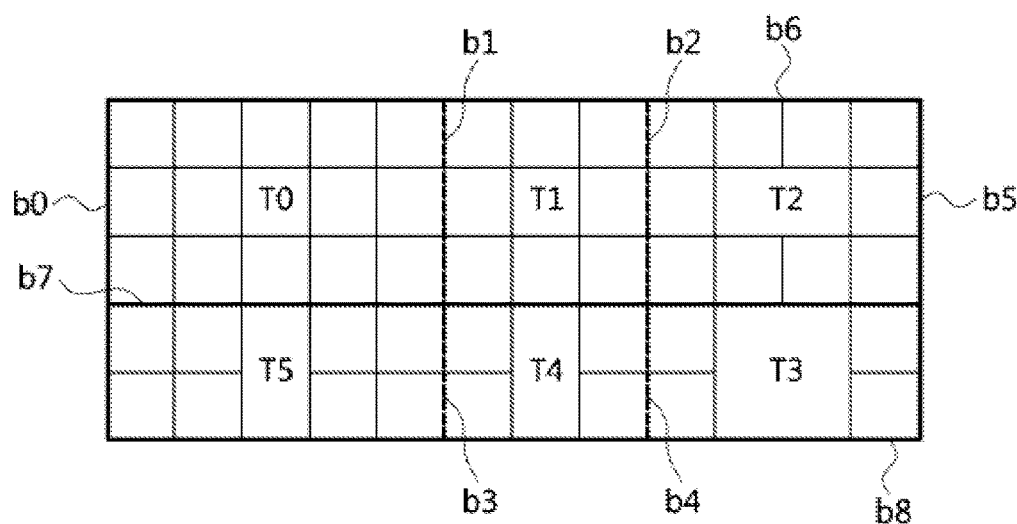

Referring to FIG. 6d, an example is shown where two tiles (a first tile including T0, T1, and T2, and a second tile including T3, T4, and T5), and six tile segments T0 to T5 are present within a picture. The tiles may be distinguished by a boundary line b7, and tile segments may be distinguished by boundary lines b1 to b4, and b7. As described above, tiles and tile segments may be obtained by boundary lines b0 to b8. In case of tile segments, partitioning is performed within a tile, and partition information according thereto may be generated. For example, b1 and b2 which are vertical column boundaries may be boundaries continuous to b3 and b4, respectively, or may be non-continuous boundaries.

Types of tile segments T0 to T5 may be classified into dependent tile segments T1, T2, T4, and T5 and independent tile segments T0 and T3. In a dependent tile segment, information used or generated for texture encoding and entropy encoding on a predetermined tile segment may be used for texture encoding and entropy encoding on another tile segment. Similarly, when performing decoding, parsing information in performing entropy decoding on a predetermined tile segment among dependent tile segments, information used or reconstructed when performing texture decoding may be used for entropy decoding and source decoding on another tile segment. Description is made by assuming that encoding/decoding a tile segment is performed by using encoding/decoding setting based on a tile.

In an independent tile segment, information used or generated for texture encoding and entropy encoding on each tile segment is not referenced, and independently encoded. Similarly, when performing decoding, parsing information and reconstruction information of another tile segment is not used for entropy decoding and texture decoding on an independent tile segment.

Information on whether a type of a tile segment is a dependent or independent type may be transmitted by being included in a tile segment header. When performing decoding on a picture, information on a tile segment type may be obtained by performing parsing on a tile segment header, and a current tile segment may be reconstructed by referring to another tile segment according to a tile segment type, or whether or not to perform decoding independently of another tile segment may be determined.

Particularly, values of syntax elements of a tile segment header of an independent tile segment, that is, header information, may not be determined by using header information of a preceding tile segment. On the contrary, header information of a tile segment header of a dependent tile segment may be determined by using header information of a preceding tile segment.

One tile may include at least one tile segment. When one tile includes one tile segment, the tile may include an independent tile segment. Also, one tile may further include one independent tile segment, and at least one dependent tile segment in addition to the independent segment. At least one tile segment included in one tile may be transmitted/received through the same access unit.

FIG. 7 is a view showing source code where information that is set when performing encoding or decoding based a tile is explicitly shown.

Referring to FIG. 7, tile_enabled_flag means a syntax element representing whether or not to perform tile partition. When tile_enabled_flag is activated (assuming being 1), it may mean that encoding/decoding is performed by performing partitioning into at least two tiles, and additional information on the tile may be determined. When tile_enabled_flag is deactivated (assuming being 0), a picture may be regarded as one tile, and encoding/decoding may be performed on the basis of a picture (or slice). Values obtained by respectively increasing num_tile_rows_minus1 and num_tile_columns_minus1 by 1 mean a number of tiles obtained by performing partitioning on the basis of a horizontal direction and a vertical direction of the picture. Although it is not shown in the present example, according to whether or not to perform uniform or non-uniform partitioning on a tile (signal indicating the same), information on a height and a width of each tile may be additionally generated, and the height and the width of each tile may be generated by being represented in a number of default coding units.

loop_filter_across_tile_enabled_flag is a syntax element representing whether or not to apply an in-loop filter to a tile boundary. When loop_filter_across_tile_enabled_flag is activated (assuming being 1), an in-loop filter such as deblocking filter, SAO, ALF etc. supported by encoder/decoder may be performed on a tile boundary, and when the loop_filter_across_tile_enabled_flag is deactivated (assuming being 0), an in-loop filter such as deblocking filter, SAO, ALF etc. may not be performed on a tile boundary. In the present example, a case where loop_filter_across_tile_enabled_flag is activated means that all in-loop filters such as deblocking filter, SAO, ALF, etc. are activated. However, it is not limited thereto, and whether or not an in-loop filter is independently applied may be set for each in-loop filter, or additional information on the same (signal indicating whether or not to apply each in-loop filter) may be generated.

independent_tile_coding_setting_enabled_flag is a syntax element representing whether or not information on encoding/decoding setting is supported on the basis of a tile. When independent_tile_coding_setting_enabled_flag is activated (assuming being 1), encoding/decoding may be performed by using encoding/decoding setting that is independent based on a tile. For example, encoding/decoding may be performed by generating partition information on a tile on the basis of a tile or information required for encoding/decoding setting. Alternatively, at least one type of encoding/decoding setting determined in a parent unit may be referenced. When independent_tile_coding_setting_enabled_flag is deactivated (assuming being 0), information required for encoding/decoding setting of a tile may be assigned in a parent unit. In detail, one type of encoding/decoding setting determined in a parent unit (for example, picture) may be referenced.

When encoding/decoding setting based on a tile is available, tile_qp_offset-enabled_flag, tile_coding_skip_enabled_flag, tile_adaptive_scan_enabled_flag, etc. may be additionally supported so as to determine encoding/decoding setting based on a tile. The above syntax elements are syntax elements representing QP setting based on a tile, applying encoding/decoding on the basis of a tile, and applying a scan order on the basis of a tile, respectively. According to whether or not each syntax element is activated (assuming being 1), additional information may be generated on the basis of a tile.

tile_coding_skip_flag is a syntax element representing whether or not to encode/decode a tile. When the same is activated, encoding/decoding may not be performed, and when the same is deactivated, encoding/decoding may be performed. According to whether or not to encode/decode a tile, whether or not to determine additional information on encoding/decoding setting based on a tile may be determined. When tile coding skip flag is activated (assuming being 1), information on encoding/decoding setting based on a tile may not be determined, and when ile_coding_skip_flag is deactivated (assuming being 0), information on encoding/decoding setting based on a tile may be determined. tile type represents a tile type and may be determined in at least one of I/P/B types. tile_scan_idx may represent a scan order of a tile, and may be determined in at least one of at least one candidate set of scan orders. tile_qp_offset may represent QP information determined on the basis of a tile, and may be configured with information on a difference value with a QP determined in a parent unit. Also, syntax elements such as end_of_tile_flag, and end_of_tile_segment_flag may be additionally configured.

The above example is an example of performing encoding/decoding setting based on a tile, and whether to apply encoding/decoding setting determined in a parent unit as it is to a tile, or whether to independently support a part thereof in a tile may be determined. An example has been described where whether or not to support encoding/decoding setting based on a tile in a parent unit is determined, and thus header information based on a tile may be generated so as to be transmitted by including the related information therein. Also, the above example is an example of encoding/decoding setting based on a tile, and information required for encoding/decoding setting may be also considered. Syntax elements described in the above example may be encoded through various binarization methods (fixed length binarization, unary binarization, truncated rice binarization, exp-Golomb binarization, etc.), and transmitted by being included in a bitstream. In addition, the related information may be reconstructed in the decoder by performing parsing.

Information related to encoding/decoding setting based on a tile which includes the above-mentioned information may be explicitly generated, or encoding/decoding setting may be implicitly determined according to a format, a feature, etc. of an image determined in a parent unit.

Figure 8:
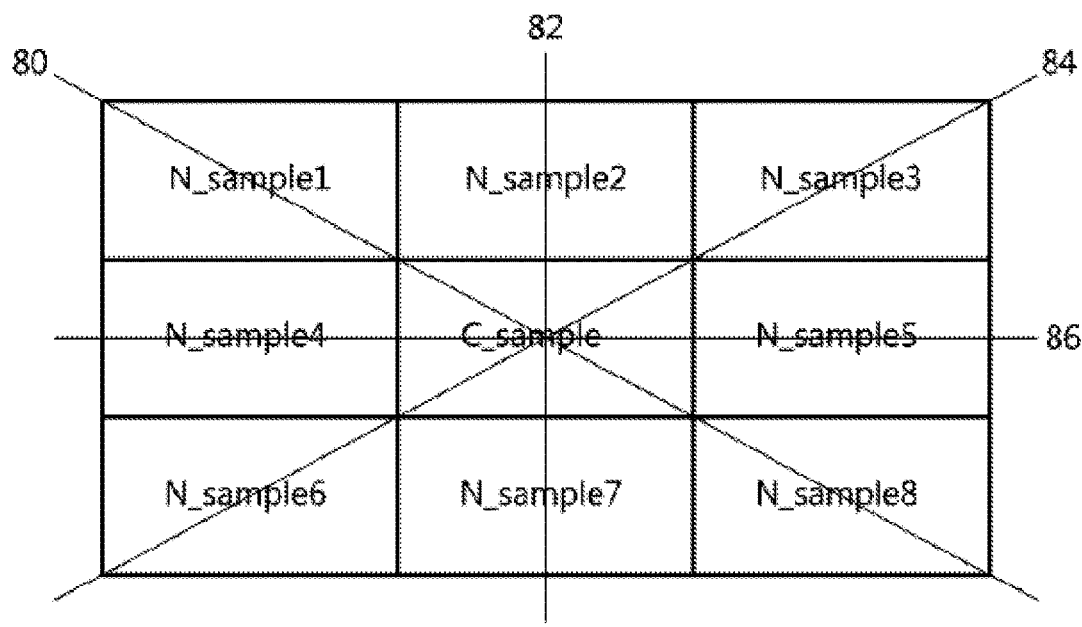
FIG. 8 is a view showing an example of a sample pixel to which a sample adaptive offset is applied according to a relative classification according to an embodiment of the present invention.
Figure 9:
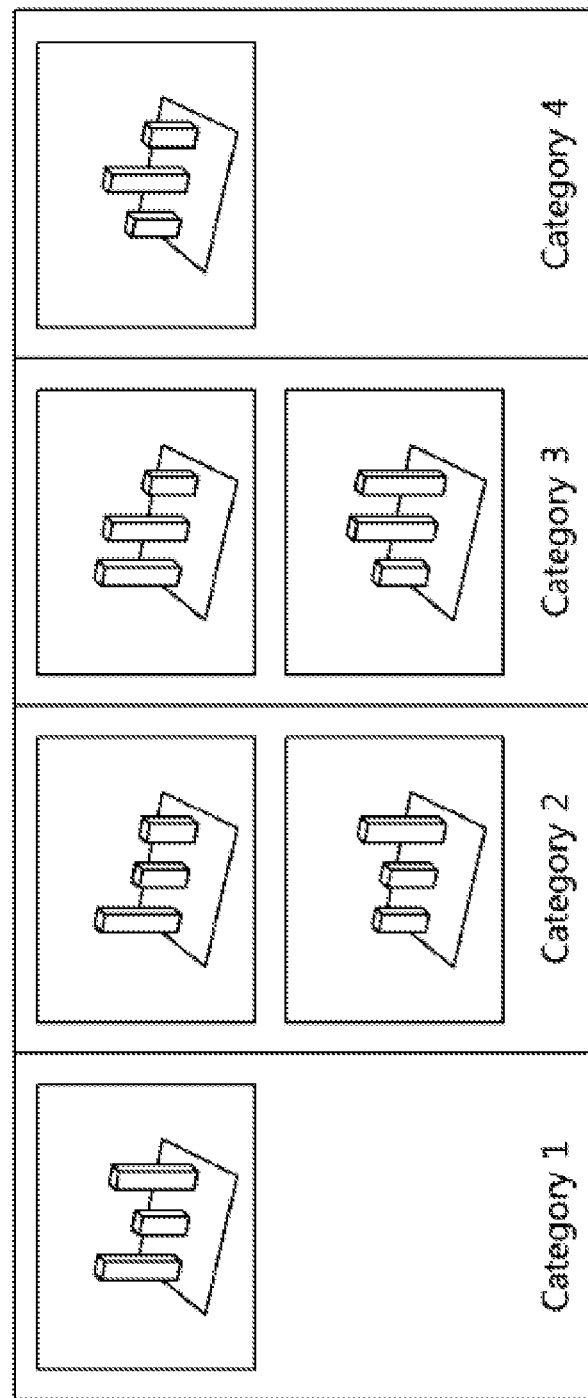
FIG. 9 is a view showing categories by performing classification according to an edge in a relative classification according to an embodiment of the present invention relative.

FIG. 8 is a view showing an example of a sample pixel to which a sample adaptive offset is applied according to a relative classification according to an embodiment of the present invention. FIG. 9 is a view showing categories by performing classification according to an edge in a relative classification according to an embodiment of the present invention relative.

SAO is a technique for reducing image degradation according to encoding/decoding setting such as QP when performing encoding/decoding. SAO may add an offset value (or correcting by using offset) based on a sample (for example, pixel). Herein, the offset value may be determined according to a color component of a sample, a classification standard (being described later), a detail classification standard (being described later), coordinate values (x,y) of the sample, etc. Herein, SAO may be referred to as a post processing filter or in-loop filter, and may be one of filtering methods included in the above filter. Herein, a sample pixel to which SAO is applied may mean a reconstructed pixel generated by adding prediction information to a residual signal. In detail, SAO may mean applying in-loop filtering (for example, SAO, ALF, etc.) to a reconstructed image obtained by adding a residual signal of a current image on which dequantization and inverse-transform are performed, and a prediction signal of the current image which is obtained by intra-prediction or inter-prediction. Herein, an offset value may be obtained on the basis of distortion between an input image and the reconstructed image.

Herein, a significant amount of data is required for generating offset information based on a sample pixel, and thus offset information may be generated based on a sample set. Accordingly, a classification standard for configuring sample sets to which respective pieces of offset information are applied may be set. Herein, the classification standard may be divided into at least one detail classification standard.

For example, the classification standard may include edge offset (EO) that is classification on whether or not a sample pixel has an edge, and band offset (BO) that is classification according to a band to which a sample pixel belongs, and additional offset may be included. Herein, the edge offset may include a detail classification standard according to an edge direction and an edge category. Also, the band offset may include a detail classification standard according to a band position. Information on the above setting may be included in the encoder/decoder, and a number of detail classification standards and a type, and additional child detail classification, etc. may be determined. Setting on offset may be determined according to a slice/tile type (I/P/B), an encoding mode, a color component/space, block size and shape, etc.

A method of classifying a sample according to an embodiment of the present invention may be divided into relative classification and absolute classification. Relative classification is a method of classifying a sample on the basis of relativity (or correlation) between a sample to which offset is applied and at least one neighboring sample, and absolute classification may be a method of classifying a sample on the basis of a feature of the sample to which offset is applied.

Relative classification may be performed according to a determination result obtained on the basis of at least two samples through features such as information on a gradient between samples, edge information, etc. In detail, relative classification may be performed on the basis of a current sample on which encoding/decoding is performed, and at least one neighboring sample on which encoding/decoding is performed.

Referring to FIG. 8, a method of setting a current sample C_sample and neighboring samples of the current sample which are N_sample1, N_sample2, . . . , and N_sample8 is shown.

In detail, in FIG. 8, the current sample may be classified according to relations with three samples which are set by a horizontal direction 86, a vertical direction 82, and diagonal directions 80 and 84 based on the current sample C_sample. Herein, directions shown in FIG. 8 may be referred to as an edge direction.

Herein, an example is shown where relative classification is applied according to relations with three continuous samples based on the current sample, but employment may be available in a method of selecting at least three odd numbered (5, 7, 9, etc.) continuous samples of according to directions 80, 82, 84, and 86 on the basis of the current sample shown in FIG. 8.

When classification is performed according to correlations with three samples selected by the plurality of directions 80, 82, 84, and 86 shown in FIG. 8, the resulting categories are as shown in FIG. 9.

Referring to FIG. 9, categories determined by comparing pixel values of three samples are shown. Herein, a height of a graph means a pixel value of a sample, a sample in the center is the current sample C_sample, and samples in left and right sides are neighboring samples N_sample. A method of classifying into categories by comparing sizes of pixel values of three samples as shown in FIG. 9 may be referred to as category classification according to an edge formed according to three samples. Accordingly, a method of setting offset information (or offset value) for each category of FIG. 9 may be referred to as edge offset.

$$(C\_sample < N\_sampleA) \text{ and }$$
$$(C\_sample < N\_sampleB) \quad \text{[Equation 1]}$$

In detail, the Equation 1 means a case where a current sample C_sample has a pixel value smaller than those of neighboring samples N_sampleA and N_sampleB, and when Equation 1 is satisfied, the current sample may be classified into a first category (Category 1).

$$(C\_sample < N\_sampleA) \text{ and }$$
$$(C\_sample = N\_sampleB) \quad \text{[Equation 2]}$$

$$(C\_sample = N\_sampleA) \text{ and }$$
$$(C\_sample < N\_sampleB) \quad \text{[Equation 3]}$$

The Equations 2 and 3 respectively mean cases where a current sample C_sample has a pixel value equal to or smaller than those of neighboring samples N_sampleA and N_sampleB. When the Equation 2 or 3 is satisfied, the current sample may be classified into a second category (Category 2).

$$(C\_sample > N\_sampleA) \text{ and }$$
$$(C\_sample = N\_sampleB) \quad \text{[Equation 4]}$$

$$(C\_sample = N\_sampleA) \text{ and }$$
$$(C\_sample > N\_sampleB) \quad \text{[Equation 5]}$$

The Equations 4 and 5 respectively mean cases where a current sample C_sample has a pixel value equal to or greater than those of neighboring samples N_sampleA and N_sampleB. When the Equations 4 or 5 is satisfied, the current sample may be classified into a third category (Category 3).

$$(C\_sample > N\_sampleA) \text{ and }$$
$$(C\_sample > N\_sampleB) \quad \text{[Equation 6]}$$

The Equation 6 means a case where a current sample C_sample has a pixel value greater than those of neighboring samples N_sampleA and N_sampleB, and when Equation 6 is satisfied, the current sample may be classified into a fourth category (Category 4).

In Equations 1 to 6, two neighboring samples (respectively referred to as N_sampleA and N_sampleB) selected according to a direction of FIG. 8 are used as neighboring samples, but at least two neighboring samples may be selected.

Referring to FIG. 9, relative size relations in pixel values according to the above-described first category (Category 1), the second category (Category 2), the third category (Category 3), and the fourth category (Category 4) are shown.

Herein, offset information may be obtained and generated on the basis of the classified category (for example, all or some of the categories may be used, or an additional category not shown may be used). Samples that are not classified into the first category to the fourth category may be classified as samples on which offset is not applied. Herein, a standard for classifying into the first category to the fourth category may be preset in the encoding apparatus and the decoding apparatus. As shown in FIG. 8, information indicating a direction (possibly referred to as an edge direction) for determining three sample pixels may be generated in the encoding apparatus and transmitted to the decoding apparatus, and direction information may be received in the decoding apparatus. In an example of a category shown in FIG. 9, direction information (or edge direction information) indicating any one of the first direction 80, the third direction 82, the fifth direction 84, and the seventh direction 86 of FIG. 8 may be generated.

Herein, for offset information, assuming that a current sample to be corrected becomes close to an average of neighboring samples, an offset sign in the category 1 and the category 2 has to be positive (+), and negative (−) in the category 3 and the category 4. Accordingly, offset information may be configured with an absolute value of an offset value excluding a sign of the offset value.

Relative classification according to an embodiment of the present invention will be described on the basis of description (defined as edge-based classification of relative classifications) of FIGS. 8 and 9.

First, according to a first embodiment of relative classification according to an embodiment of the present invention, three samples are not selected according to any one direction shown in FIG. 8, and a plurality of neighboring samples selected regardless of a direction may be used.

Describing by referring to FIG. 8 again, classification into categories may be performed by comparing sizes of a pixel value of a current sample C_sample and pixel values of neighboring samples N_sample1, N_sample2, . . . , and N_sample8 neighboring the current sample.

For example, when a case where a pixel value of a current sample is greater than those of eight neighboring samples N_sample1, N_sample2, . . . , and N_sample8 neighboring the current sample is equal to or greater than a preset threshold times (or when current sample is greater in all cases), the current sample may be classified into a first category.

Also, when a case where a pixel value of a current sample is equal to or smaller than those of eight neighboring samples N_sample1, N_sample2, . . . , and N_sample8 neighboring the current sample is equal to or greater than a preset threshold times (or when current sample is equal to or smaller in call cases), the current sample may be classified into a second category.

Also, when a case where a pixel value of a current sample is equal to or greater than those of eight neighboring samples N_sample1, N_sample2, . . . , and N_sample8 neighboring the current sample is equal to or greater than a preset threshold times (or the current sample is equal to or greater in all cases), the current sample may be classified into a third category.

Also, when a case where a pixel value of a current sample is smaller than those of eight neighboring samples N_sample1, N_sample2, . . . , and N_sample8 neighboring the current sample is equal to or greater than a preset threshold times, the current sample may be classified into a fourth category.

Herein, description is made by comparing the current sample and the eight neighboring samples neighboring the current sample, but it is not limited thereto. For example, a current sample may be compared with four neighboring samples adjacent in horizontal and vertical directions (in FIG. 8, N_sample2, N_sample4, N_sample5, and N_sample7), or the current sample may be compared with four neighboring samples adjacent in a diagonal direction (in FIG. 8, N_sample1, N_sample3, N_sample6, and N_sample8).

Accordingly, in the first embodiment of relative classification according to an embodiment of the present invention, edge information on the current sample may be determined by performing comparison with neighboring samples (for example, the above-described four or eight neighboring samples) around the current sample.

Also, category information according to the first embodiment of relative classification according to an embodiment of the present invention may be implicitly set, offset information may be generated to include offset information with or without an offset sign, and whether or not to include an offset sign may be determined according to setting in the encoder/decoder. For example, assuming that a current sample to be corrected becomes close to a neighboring sample, offset information with an offset sign may be generated, and offset information without an offset sign may be generated when the above assumption is not present. When generating offset information with an offset sign, one sign (one of + sign and − sign which enables the current sample to become close to the neighboring sample) may be set such that an occurrence probability becomes high when performing entropy encoding/decoding, and the opposite sign may be set that an occurrence probability becomes low.

Also, when a case occurs where a difference between neighboring samples based on a current sample is equal to or greater than a preset value (th_val), category classification may be performed by determining that impulse has occurred, or classification into a new category may be performed.

According to a second embodiment of relative classification according to an embodiment of the present invention, rather than performing classification into categories according to any one direction shown in FIG. 8, classification into categories may be performed by additionally using a plurality of directions that are parallel to the direction of FIG. 8.

For example, when classification into categories is performed by comparing a pixel value of a current sample with pixel values of neighboring samples according to a horizontal direction 86 of FIG. 8, comparing with pixel values of samples determined according to a plurality of directions parallel to the horizontal direction 86 may be additionally performed. In detail, as directions parallel to the horizontal direction 86, a direction passing a first sample N_sample1, a second sample N_sample2, and a third sample N_sample3, and a direction passing a sixth sample N_sample6, a seventh sample N_sample7, and an eighth sample N_sample8 may be additionally used. Accordingly, among three horizontal directions including the horizontal direction 86 of FIG. 8 and two directions parallel to the horizontal direction 86, when a condition of comparing pixel values according to Equations 1 to 6 is satisfied for a preset value or greater (for example, two directions), classification into one of the first category to the fourth category may be performed. Herein, in a direction below a preset value, when the condition of comparing pixel values according to Equations 1 to 6 is satisfied, a current sample is not classified into the above categories. According to the second embodiment of relative classification, an edge in a plurality of directions may be determined, and thus the same may be referred to as classification based on two-dimensional edge information.

Samples may be classified according to the second embodiment of relative classification according to an embodiment of the present invention, and offset information may be obtained and generated on the basis of a category according to the classification. Category information may be implicitly or explicitly set. In case of explicit setting, a syntax element (related to binarization) may be generated on the basis of information on a number of candidate sets of the entire category sets. In the present example, examples of a total number of pixels used when performing classification according to relativity are 5 and 9, but the number may be determined according to setting in the encoder/decoder.

According to a third embodiment of relative classification according to an embodiment of the present invention, classification may be performed by using a pixel value of a current sample, pixel values of neighboring samples, and a pixel value gradient between the current sample and the neighboring samples.

When two neighboring samples N_sampleA and N_sampleB are selected based on the current pixel C_sample according to a direction of FIG. 8, classification into categories may be performed according to a pixel value gradient.

$$(N\_sampleB < C\_sample < N\_sampleA) \quad \text{[Equation 7]}$$

$$(N\_sampleB = C\_sample < N\_sampleA) \quad \text{[Equation 8]}$$

$$(N\_sampleB < C\_sample = N\_sampleA) \quad \text{[Equation 9]}$$

Referring to relations of the Equations 7 to 9, it may be confirmed that a gradient of pixel values of three samples according to a direction of FIG. 8 increases. Accordingly, when relations between a current sample and neighboring samples satisfy Equation 7, 8 or 9, classification into a first category may be performed.

$$(N\_sampleB > C\_sample > N\_sampleA) \quad \text{[Equation 10]}$$

$$(N\_sampleB = C\_sample > N\_sampleA) \quad \text{[Equation 11]}$$

$$(N\_sampleB > C\_sample = N\_sampleA) \quad \text{[Equation 12]}$$

Referring to the Equations 10 to 12, it may be confirmed that a gradient of pixel values of three samples according to a direction of FIG. 8 decreases. Accordingly, when relations between a current sample and neighboring samples satisfy Equation 10, 11 or 12, classification into a second category may be performed.

Meanwhile, in the third embodiment of relative classification according to an embodiment of the present invention, in addition to a gradient of pixel values, a magnitude of the gradient may be additionally considered.

For example, when a gradient of pixel values between a current sample and neighboring samples increases, and a magnitude of the gradient (for example, defined as a difference value between the pixel value of the current sample and the pixel value of the neighboring sample) is equal to or greater than a preset threshold value, classification into a first category may be performed. Similarly, when a gradient of pixel values between a current sample and neighboring samples decreases, and a magnitude of the gradient is equal to or greater than a preset threshold value, classification into a second category may be performed. In other words, in addition to a relative size between the current sample and the neighboring sample, a difference value between the pixel value of the current sample and the pixel value of the neighboring sample may be used for a standard of relative classification. The present example may be a case of replacing or adding the second category and the third category of the first embodiment.

Category information may be implicitly set, information on a gradient direction may be explicitly set, and samples that are not classified by the above condition may become samples on which offset is not applied. In other words, samples classified by edge classification may not be classified by the above condition, and may be classified into samples on which offset is not applied.

According to a fourth embodiment of relative classification according to an embodiment of the present invention, categories may be set by additionally using a gradient of pixel values in edge-based classification of FIGS. 8 and 9.

For example, a first category according to Equations 1 to 6 may be set as a case where a current sample C_sample has a pixel value smaller than those of neighboring samples N_sampleA and N_sampleB, and a difference between the pixel values of the current sample and the neighboring samples is equal to or greater than a preset threshold value.

Also, a second category according to Equations 1 to 6 may be set as a case where a current sample C_sample has a pixel value equal to or smaller than those of neighboring samples N_sampleA and N_sampleB, and a difference between the pixel values of the current sample and the neighboring samples is equal to or greater than a preset threshold value.

Also, a third category according to Equations 1 to 6 may be set as a case where a current sample C_sample has a pixel value equal to or greater than those of neighboring samples N_sampleA and N_sampleB, and a difference between the pixel values of the current sample and the neighboring samples is equal to or greater than a preset threshold value.

Also, a fourth category according to Equations 1 to 6 may be set as a case where a current sample C_sample has a pixel value greater than those of neighboring samples N_sampleA and N_sampleB, and a difference between the pixel values of the current sample and the neighboring samples is equal to or greater than a preset threshold value. Herein, the fourth embodiment performs division into a sample with few errors and a sample with many errors among samples classified according to edge-based classification so as to apply a different offset value to the classified sample.

Relative classification according to an embodiment of the present invention may additionally perform detail classification for the category by combining at least two of the first to the third embodiments. For example, relative classification according to an embodiment of the present invention may perform primary classification by using categories defined according to edge-based classification of FIGS. 8 and 9, and perform secondary classification on the respective categories obtained from the primary classification on the basis of a gradient form or gradient magnitude between samples. The above-described fourth embodiment of relative classification may be one of an example of such modifications.

Category information may be implicitly or explicitly set, and information on an edge direction may be processed by performing explicitly setting. Offset information may be generated to include offset information with or without an offset sign according to each case, and whether or not to include an offset sign may be determined according to setting in the encoder/decoder. For example, in case of Category 1 and Category 4 of FIG. 9, offset information without an offset sign may be generated, and in case of Category 2 and Category 3, offset information with an offset sign may be generated.

Figure 10:
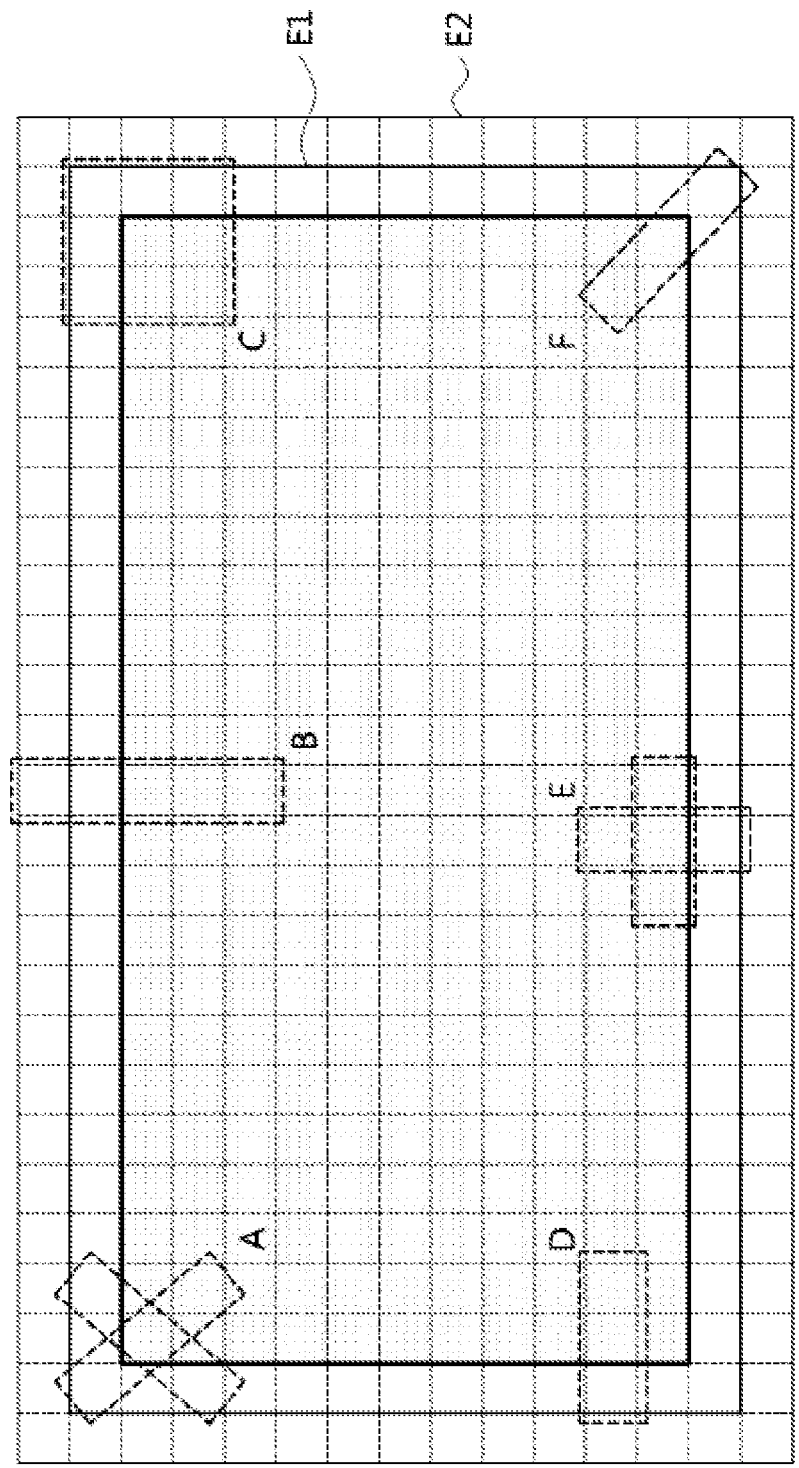
FIG. 10 is a view showing an example of a method of assigning an offset value to a block to which sample adaptive offset is applied according to relative classification according to an embodiment of the present invention.

FIG. 10 is a view showing an example of a method of assigning an offset value to a block to which sample adaptive offset is applied according to relative classification according to an embodiment of the present invention.

Referring to FIG. 10, sample adaptive offset may be performed on all samples positioned within dotted blocks. Herein, a current sample and neighboring samples in association with relative relations are represented as A to F. A of FIG. 10 shows where five samples are set according to diagonal directions such as 80 and 840 of FIG. 8, B of FIG. 10 shows where five samples are set according to a vertical direction such as 82 of FIG. 8, and C of FIG. 10 shows where nine samples are set based on a current sample. D of FIG. 10 shows where three samples are set according to a horizontal direction as 86 of FIG. 8, E of FIG. 10 shows where five samples are set according to vertical and horizontal directions such as 82 and 86 of FIG. 8, and F of FIG. 10 shows where three samples are set according to a diagonal direction such as 80 of FIG. 8.

Herein, when a neighboring sample is positioned within the dotted block (for example, being present within a picture or within a slice or tile identical to a current block), sample adaptive offset may be performed by using sample on which filtering is not performed but encoding/decoding is completed, and when a neighboring sample is positioned outside of a boundary of the dotted block (for example, being present outside of a boundary of a picture or in a slice or tile differing from a current block), whether or not a region to which the neighboring sample belong is available may be determined first.

Whether or not to apply relative classification on the neighboring sample may be determined according to the above determination result. As above, when a non-usable sample is present according to the above determination result, a sample within the current block may be used to fill the non-usable sample. For example, for a sample outside of an image, a boundary sample belonging to a current block and adjacent to the sample outside of image may be used by performing copying or linear extrapolation on the same.

Also, even though a neighboring sample is positioned outside of a boundary of the dotted block, obtaining may be performed on a partial region of the current image. For example, in case of a 360-degree image, a region that is not adjacent in a two dimensional space but have correlation may be present within an image, and thus data of a neighboring sample may be used by obtaining the same by performing copying or transform on data from a region having correlation (in the present example, assuming a region that is not spatially adjacent) with a current pixel (or block).

Herein, when a number of samples positioned outside of the block and determined to be non-usable according to the determination result is large (two in case of B), an image of up to two pixel spaces may be filled (E2 region), and in a general case (A, C, D, E, and F excluding B), an image (E1) of one pixel space may be filled.

Figure 11:
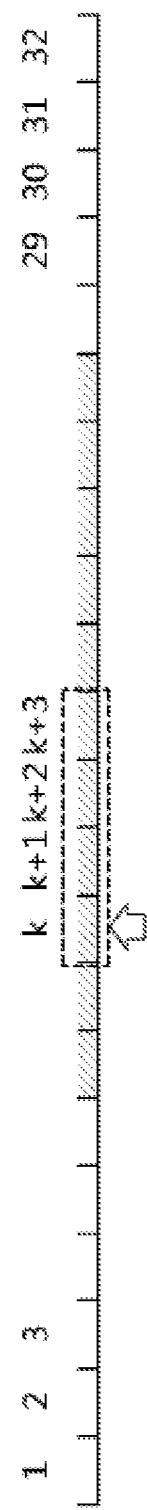
FIG. 11 is a view of an example showing a method of performing sample adaptive offset according to absolute classification according to an embodiment of the present invention.

FIG. 11 is a view of an example showing a method of performing sample adaptive offset according to absolute classification according to an embodiment of the present invention.

Sample adaptive offset based on absolute classification according to an embodiment of the present invention may be a method of setting an offset value on the basis of a feature such as brightness value of the sample, band information, etc. of a sample on which offset is applied. Herein, a target sample on which sample adaptive offset according to absolute classification is performed may be a current sample on which encoding/decoding is performed.

Referring to FIG. 11, a range of a pixel value which is determined according to a bit depth may be partitioned by a pixel value band having a predetermined interval. In detail, when a bit depth is 8 bit (a pixel value ranges from 0 to 255), uniform partitioning into $2^5$ (that is, 32) bands may be performed. Herein, in sample adaptive offset based on absolute classification, an offset value may be set for samples belonging to partial bands among a plurality of bands obtained from the partitioning. Herein, a band to which a sample belongs may be determined on the basis of a brightness value of each sample.

Information on a start position of a band in which a sample adaptive offset value is set may be transmitted from the encoding apparatus to the decoding apparatus, and offset information may be generated for some continuous bands including the band to which the start position belongs (four bands including a band k of a start position of an example of FIG. 11). Herein, band-related setting (a number of bands, interval, etc.) may be predetermined in the encoding/decoding apparatus, and information on a start position of the band to which an offset value is applied may be generated. Also, herein, for the information on the start position, one candidate may be selected (fixed length: 5 bits) among the entire bands (for example, 32 bands). Offset information is configured with an offset absolute value and sign information.

Absolute classification according to an embodiment of the present invention may be performed (or classified) according to brightness information on a sample. A sample used for detail classification may be at least one sample. Also, for detail classification (for example, band length, a number of bands obtained from partitioning, etc. which are band-related setting), fixed setting (for example, fixed band length, fixed number of bands, etc.) or adaptive setting (in the present example varying according to the encoder/decoder) may be used. In adaptive setting, related information may be implicitly determined or the related information may be explicitly processed. Also, information on a band (for example, information on a band position) to which offset is applied may be generated on the basis of information on a fixed band candidate set or adaptive band candidate set. Also, a number of available candidate sets may be determined according to band-related setting (in the present example, number of bands, etc.). The band-related setting may be determined by at least one factor (in the present example, quantization parameter, band partition parameter, information on pixel value range, etc.). Additional setting including the above information may be determined according to the encoder/decoder, and information on the above setting may be transmitted on the basis of a video, a sequence, a picture, a slice, a tile, a block, etc. by being included in a bitstream, and the related information may be reconstructed in the decoder by performing parsing. It is not limited to the above examples and may be modified and expanded in various cases.

A length and a number of bands used in absolute classification according to an embodiment of the present invention may be adaptively determined. For example, partitioning into $2^k$ bands may be performed according to a variable k, and a band length may be $2^{(bit\_depth)-k}$ in association with a bit depth(bit_depth). A band length through which offset is efficiently applied may be present according to an image, and for the same, adaptive setting may be supported. A variable k may be implicitly determined according to encoding/decoding setting (for example, block size and shape, image type, etc.) or related information may be explicitly included. A number of bands, a band length, etc. may be determined through the variable k.

Figure 12:
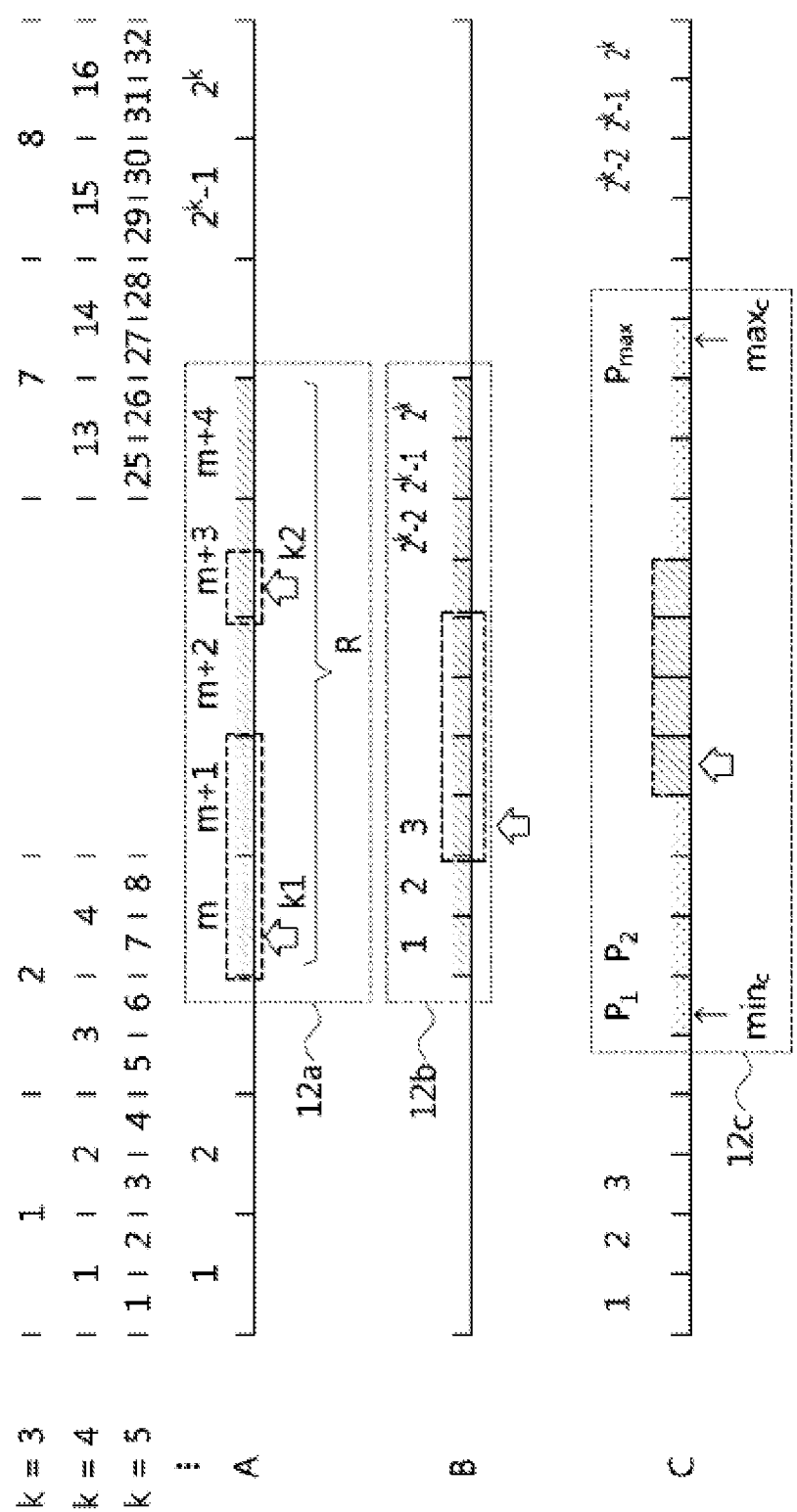
FIG. 12 is a view of an example showing a method of generating various types of band information according to an embodiment of the present invention.

FIG. 12 is a view of an example showing a method of generating various types of band information according to an embodiment of the present invention.

Sample adaptive offset based on absolute classification according to an embodiment of the present invention may be performed by generating adaptive band information (for example, information on band start position). One piece of information may be generated according to a preset condition (for example, condition that offset information on n continuous bands is generated where one piece of positional information is generated, that is, n being preset). Alternatively, at least two pieces of positional information may be generated on the basis of a band where offset is applied. Alternatively, positional information may be generated the basis of a reconstructed sample of a current image.

Referring to 12a, at least two pieces of positional information of applying offset may be generated (in the present example, two pieces of band information, that is, assuming that bands where offset is applied are not continuous). In detail, in order to indicate that sample adaptive offset is applied to a band m, positional information k1 of the band m may be generated, and in order to indicate that sample adaptive offset is applied to a band m+3, positional information k2 of the band m+3 may be generated. Herein, positional information on a band (band where offset information is generated) may be sequentially generated on the basis of the first band, or may be generated in the reverse order on the basis of the last band. Positional information on a band to which offset is applied may be generated by performing independent or dependent setting.

When at least two pieces of band information are generated, for positional information of the first band, a syntax element (in the present example, fixed length binarization: k bit) may be generated on the basis of the total number of bands (in the present example, $2^k$), and for positional information on a band after positional information of the first band, a syntax element may be generated (in case of independent) on the basis of positional information on a band on which encoding/decoding is previously performed and a number of total bands, or may be generated (in case of dependent) on the basis of positional information of a band on which encoding/decoding is previously performed.

In the latter case, as shown in 12a, when positional information of the first band is k1 and positional information of the second band is k2, k1 is encoded/decoded first, and k1 may be used for a prediction value of k2 that is positional information of the second band. Accordingly, by using k2 that is positional information of the second band, a difference value with positional information (that is, prediction value) of the first band may be generated. In the decoding apparatus, k2 may be reconstructed by adding the prediction value that is k1, and a difference value between k2 and k1. Herein, a syntax element (in the present example, applying a binarization method using a maximum value) for the maximum value that is a difference value between the total number of bands and k1 may be generated. The above example is description for positional information of the first and second bands, and the above example may be identically or similarly applied to a case of adding at least two pieces of band positional information (for example, when encoding/decoding positional information on a band to be encoded/decoded and a difference value with positional information on a band on which encoding/decoding is previously completed).

Meanwhile, hatched regions in 12a mean bands where pixel values constituting an image are present. Herein, a range of a pixel value constituting an image (for example, picture, slice, tile, block, etc.) may be determined in the encoding/decoding apparatus, and positional information on a band may be generated or obtained on the basis of the range of the pixel value of the image (or start positional information on a band). Also, a band length may be determined on the basis of the range of the pixel value for the image, and offset information may be generated or obtained on the basis of the band length. Referring to 12b, in 12a, a range of a pixel value constituting an image may be divided into $2^k$ bands. Herein, for a length of each band, a band length that is narrower than those of $2^k$ bands which are obtained on the basis of a bit depth may be obtained.

For example, the minimum pixel value and the maximum pixel value of a current image may be set as the entire range of the pixel value, and the set range of the pixel value may be partitioned into $2^k$ bands. Herein, a length (width) of one band is smaller than respective lengths of the bands obtained by partitioning the range of the pixel value into $2^k$ bands according to a bit depth, and thus precise correction may be performed through offset, and offset information (in the present example, applying a binarization method taking into account a maximum value) may be generated according to the band length. In other words, determination may be performed according to k and a band length. For example, when a range of a pixel value (for example, when the maximum value of a pixel is 128, the minimum value is 10, a range of the pixel value is 118) is partitioned into $2^k$ bands, and when k is 5, the maximum length of one band is 4 (when k is 5, and a range of a pixel value is 0 to 255, a band length is 8), and a syntax element of offset may be generated on the basis of the length. In the present example, a band may be obtained by partitioning an image on the basis of a range of a pixel value, and offset information may be obtained on the basis of a length of the obtained band.

Also, in 12c, a range of a pixel value may be determined on the basis of a bit depth, and the range of the pixel value determined on the basis of the bit depth may be partitioned into $2^k$ bands. The entire range (from 0 to 255 based on 8 bits) of the pixel value is determined according to the bit depth, and thus the bands have a fixed length according to a number of bands, and offset information may be generated on the basis of the above band length. Herein, when the minimum pixel value (minc) and the maximum pixel value (maxc) in an image are respectively present in bands P1 and Pmax, a band where offset information may occur is present between the band P1 and the band Pmax. Accordingly, a number of (Pmax−P1+1) may be a number of bands where offset information is generated, and thus positional information on a band where offset information is generated may be generated by using (Pmax−P1+1) as the maximum value.

Referring to 12a, when the entire range of a pixel value is partitioned by bands according to a bit depth, the total number of bands is 32 (assuming k being 5), but the actual total number of bands is 5 as bands where a pixel value is present are bands between bands m and m+4. When the total number of bands is 32, through 5-bit fixed length binarization, a syntax element (5 bits is required when information on a band position is only transmitted) for band positional information may be generated, and when the total number of bands is 5, through fixed length binarization where the maximum value is 5, a syntax element (in the present example, 2, and 3 bit is required) may be generated. In other words, a band length can be maintained, and encoding efficiency can be improved by reducing information generated due to band information. In the present example, a band may be obtained by performing partitioning on the basis of a bit depth, positional information on the band may be generated on the basis of a range of a pixel value of an image.

The above example may be a case where a number of pieces of offset information is fixed (assuming being 4). A number of pieces of offset information may be adaptive according to encoding/decoding setting, and a number of offsets may be adaptively determined according to a feature of an image. For example, as shown in 12a, when bands are obtained by performing partitioning according to a bit depth, and a pixel value of an image (in the present example, assuming being a block) is present in three or fewer bands, four offsets are not required, and thus three pieces of offset information may be generated. Herein, a start position of the band to which offset is applied may also be an example obtained implicitly. In the present example, a number of offsets may be adaptively determined on the basis of a range of a pixel value of an image, and band positional information may be implicitly determined.

Various examples according to a range of a pixel value of an image are described with reference to FIG. 12. However, it is not limited thereto, various modifications and combination examples may be available, and a combined configuration with additional elements not described through the above examples may be available. Herein, the image may be one of a reconstructed image and an original image. In case of a reconstructed image, range information on a pixel value may be implicitly obtained, and in case of an original image, range information on a pixel value may be explicitly obtained. A reconstructed image may mean an image before applying a filter image (that is, image where encoding/decoding being completed but before applying an in-loop filter). Range information on a pixel value of an original image has been described through a process of adjusting a pixel value according to a range of the pixel value, and the encoder and the decoder may determine range information on a pixel value of an original image by using information implicitly included in a bitstream.

FIG. 13 is a view of source code showing a syntax element used in sample adaptive offset on the basis of relative classification and absolute classification according to an embodiment of the present invention.

Referring to FIG. 13, sps_sample_adaptive_offset_enabled_flag may be a syntax element representing whether or not SAO is supported in a sps, pps_sample_adaptive_offset_enabled_flag may be a syntax element representing whether or not SAO is supported in a pps, slice_sample_adaptive_offset_enabled_flag may be a syntax element representing whether or not SAO is supported in a slice, and a syntax element representing whether or not SAO is supported in other units (tile, etc.) may be defined. When syntax elements of a parent unit are activated, whether or not to additionally generate a syntax element of a child unit may be determined. In the present example, when the syntax element is activated in a slice (in the present example, assuming being 1), slice_sao_luma_flag, slice_sao_chroma_flag that is a syntax element representing whether or not to apply SAO according to a color component may be generated, and when the syntax element is deactivated (in the present example, assuming being 0), SAO may not be applied to a corresponding image.

When SAO is applied to one of a luma component and a chroma component, a syntax element of offset_type1_enabled_flag may be defined, and the syntax element may be a syntax element representing whether or not to apply a preset type of SAO. In the present example, the preset type may be a method of applying offset applying by using absolute classification (or a method of applying offset method by using relative classification), and offset_type2_enabled_flag may be a method of applying offset by using relative classification (or a method of applying offset by using absolute classification). When offset_type1_enabled_flag is activated, a syntax element of offset_type2_enabled_flag may be additionally defined. When offset_type1_enabled_flag is deactivated, offset_type2_enabled_flag may not be additionally defined but type2 may be implicitly activated. type1 and type2 may be activated, or one of type1 and type2 may be activated. This may be a syntax element defined in a slice, or may be a syntax element defined in other units (sequence, picture, tile, etc.).

For offset-related information, referring to at least one neighboring block on which encoding/decoding is completed may be performed. Herein, the reference block may be left, upper left, lower left, upper, and upper right blocks, etc. A referenced candidate set may be at least two blocks, and priorities (related to generating a syntax element) of the referenced block may be determined according to encoding/decoding setting. Alternatively, an order identical or similar to an order used of referring to prediction information from a neighboring block in intra-prediction or inter-prediction (block position or sub-block position within the block) may be used, or an independent order may be set. sao_merge_flag may be a syntax element representing whether or not offset-related information is obtained from a neighboring block, and sao_merge_idx may be a syntax element representing information on the neighboring block. Referring to the entire or partial piece of offset-related information may be performed from a neighboring, and when partial piece of offset-related information is obtained, an additional syntax element may be defined.

sao_type_idx may mean information on a selected method of applying offset, and may be a syntax element generated when at least two methods of applying offset are supported. sao_offset_abs may be information on an absolute value of offset, and may be generated as many as k. k may be determined according to encoding/decoding setting. sao_offset_sign may be sign information on offset information, and may be a syntax element generated when information on an absolute value of offset is not 0. Sign information on offset may be supported according to setting in a method of applying offset, and when the setting in the method of applying offset supports information on an absolute value without a sign, sign information may not be generated, and when information on an absolute value with a sign is supported, the sign information may be generated. sao_type_info may be information according to detail classification of the method of applying offset.

The offset (relative classification or absolute classification) setting information may be determined according to encoding/decoding setting (in the present example, block size and shape, image type, encoding mode, quantization parameter, etc.), and at least one combination configured by the above process may be possible.

Figure 14:
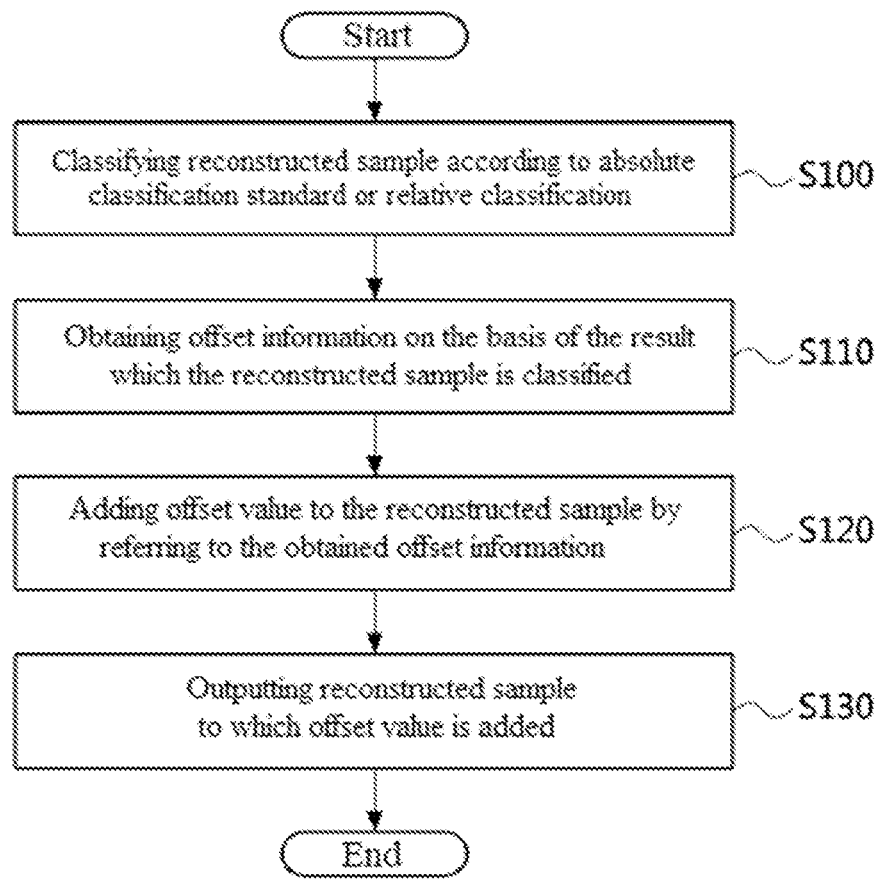
FIG. 14 is a view of a flowchart showing a method of performing sample adaptive offset according to absolute classification or relative classification according to an embodiment of the present invention.

FIG. 14 is a view of a flowchart showing a method of performing sample adaptive offset according to absolute classification or relative classification according to an embodiment of the present invention.

Referring to FIG. 14, a method of performing sample adaptive offset according absolute classification or relative classification in the image decoding apparatus may include: S100 of classifying a reconstructed sample according to an absolute classification standard or relative classification standard; S110 of obtaining offset information on the basis of a result of which reconstructed sample is classified; S120 of adding an offset value to the reconstructed sample by referring to the obtained offset information; and S130 of outputting the reconstructed sample to which the offset value is added.

Herein, the S100 of classifying reconstructed samples may include: when the classification standard is the absolute classification, classifying the reconstructed sample according to a band to which a brightness value of the reconstructed sample belongs.

Herein, the S100 of classifying reconstructed sample may include: when the classification standard is the relative classification, classifying the reconstructed sample on the basis of at least one of gradient information and edge information derived by comparing a pixel value of the reconstructed sample and pixel values of neighboring samples adjacent to the reconstructed sample.

Methods according to embodiments of the present disclosure may be implemented in the form of program instructions executable through diverse computing means and may be recorded in computer readable media. The computer readable media may include independently or associatively program instructions, data files, data structures, and so on. Program instructions recorded in the media may be specially designed and configured for embodiments, or may be generally known by those skilled in the computer software art.

Computer readable recording media may include magnetic media such as hard disks and floppy disks, optical media such as CD-ROM and DVD, magneto-optical media such as floptical disks, and hardware units, such as ROM, RAM, flash memory, and so on, which are intentionally formed to store and perform program instructions. Program instructions may include high-class language codes executable by computers using interpreters, as well as machine language codes likely made by compilers. The hardware units may be configured to function as one or more software modules for performing operations according to embodiments of the present disclosure, and vice versa.

Also, the above-described method or apparatus may be implemented by combining all or part of the configuration or function, or may be implemented separately While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of decoding an image, wherein the method is performed in an image decoding apparatus, the method comprising:
dividing, based on division information signaled through a bitstream, a picture including a current block into tiles; and
reconstructing the current block, the current block resulting from partitioning a maximum coding unit based on at least one of a quad-tree partition or a binary-tree partition,
wherein one of the tiles is divided into tile segments by at least one division boundary line in only one of a vertical direction or a horizontal direction independently of others of the tiles,
wherein each of the tile segments is composed of an integer number of maximum coding unit rows,
wherein each of the maximum coding unit rows includes a plurality of maximum coding units,
wherein the each of the tile segments has a rectangular shape,
wherein the quad-tree partition is performed based on a first partition flag indicating whether to perform the quad-tree partition,
wherein when a size of the coding block is greater than or equal to a pre-defined threshold size, the quad-tree partition only is performed,
wherein the pre-defined threshold size is 128×128, and
wherein the binary-tree partition is performed only when the quad-tree partition is no longer performed.

2. The method of claim 1,
wherein the binary-tree partition is performed based on a second partition flag indicating whether to perform the binary-tree partition and a partition direction flag indicating either horizontal partition or vertical partition.

3. A method of encoding an image, wherein the method is performed in an image encoding apparatus, the method comprising:
dividing a picture including a current block into tiles; and
reconstructing the current block, the current block resulting from partitioning a maximum coding unit based on at least one of a quad-tree partition or a binary-tree partition,
wherein division information on the dividing of the picture is encoded into a bitstream,
wherein one of the tiles is divided into tile segments by at least one division boundary line in only one of a vertical direction or a horizontal direction independently of others of the tiles,
wherein each of the tile segments is composed of an integer number of maximum coding unit rows,
wherein each of the maximum coding unit rows includes a plurality of maximum coding units,
wherein the each of the tile segments has a rectangular shape,
wherein a first partition flag indicating whether to perform the quad-tree partition is encoded into the bitstream,
wherein when a size of the coding block is greater than or equal to a pre-defined threshold size, the quad-tree partition only is performed,
wherein the pre-defined threshold size is 128×128, and
wherein the binary-tree partition is performed only when the quad-tree partition is no longer performed.

4. A non-transitory computer-readable medium storing a bitstream generated by an encoding method, the method comprising:
dividing a picture including a current block into tiles; and
reconstructing the current block, the current block resulting from partitioning a maximum coding unit based on at least one of a quad-tree partition or a binary-tree partition,
wherein division information on the dividing of the picture is encoded into the bitstream,
wherein one of the tiles is divided into tile segments by at least one division boundary line in only one of a vertical direction or a horizontal direction independently of others of the tiles,
wherein each of the tile segments is composed of an integer number of maximum coding unit rows,
wherein each of the maximum coding unit rows includes a plurality of maximum coding units,
wherein the each of the tile segments has a rectangular shape,
wherein a first partition flag indicating whether to perform the quad-tree partition is encoded into the bitstream,
wherein when a size of the coding block is greater than or equal to a pre-defined threshold size, the quad-tree partition only is performed,
wherein the pre-defined threshold size is 128×128, and
wherein the binary-tree partition is performed only when the quad-tree partition is no longer performed.

* * * * *